United States Patent
Danjo et al.

(10) Patent No.: US 11,074,493 B2
(45) Date of Patent: Jul. 27, 2021

(54) BOLTZMANN MACHINE, METHOD FOR CONTROLLING BOLTZMANN MACHINE, AND INFORMATION PROCESSING DEVICE HAVING BOLTZMANN MACHINE

(71) Applicant: FUJITSU LIMITED, Kawasaki (JP)

(72) Inventors: Takumi Danjo, Kawasaki (JP); Sanroku Tsukamoto, Setagaya (JP); Hirotaka Tamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 864 days.

(21) Appl. No.: 15/419,238

(22) Filed: Jan. 30, 2017

(65) Prior Publication Data

US 2017/0220924 A1    Aug. 3, 2017

(30) Foreign Application Priority Data

Feb. 3, 2016    (JP) .............................. JP2016-018668

(51) Int. Cl.
*G06N 3/04*    (2006.01)
*G06N 3/063*    (2006.01)
*G06N 7/00*    (2006.01)

(52) U.S. Cl.
CPC ............ *G06N 3/04* (2013.01); *G06N 3/0445* (2013.01); *G06N 3/0472* (2013.01); *G06N 3/063* (2013.01); *G06N 7/005* (2013.01)

(58) Field of Classification Search
CPC ................................. G06N 3/04; G06N 7/005
USPC ......................................................... 706/12
See application file for complete search history.

(56) References Cited

U.S. PATENT DOCUMENTS

| | | | |
|---|---|---|---|
| 5,202,956 A * | 4/1993 | Mashiko | G06N 3/063 706/39 |
| 5,333,241 A | 7/1994 | Furuta et al. | |
| 5,459,817 A * | 10/1995 | Shima | G06N 3/08 706/25 |
| 5,517,596 A * | 5/1996 | Pechanek | G06N 3/063 706/25 |
| 2013/0176156 A1* | 7/2013 | Danjo | H03K 5/249 341/155 |

(Continued)

FOREIGN PATENT DOCUMENTS

| | | |
|---|---|---|
| JP | 2-27493 | 1/1990 |
| JP | 4-18661 | 1/1992 |

(Continued)

*Primary Examiner* — Lut Wong
(74) *Attorney, Agent, or Firm* — Staas & Halsey LLP

(57) ABSTRACT

Boltzmann machine includes a plurality of circuit units each having an adder that adds weighted input signals and a comparison unit that compares an output signal of the adder with a threshold signal to output a binary output signal; and digital arithmetic units each generating the weighted input signals by weighting the binary output signal of the circuit units with a weight. The comparison unit has a first comparator that compares a thermal noise with a reference voltage to output a binary digital random signal, a DA converter that converts the digital random signal to an analog random signal and varies a magnitude of the analog random signal, and a second comparator that compares the output signal of the adder with the analog random signal to generate the binary output signal with a predetermined probability function.

10 Claims, 20 Drawing Sheets

(56) References Cited

U.S. PATENT DOCUMENTS

2014/0132437 A1* 5/2014 Danjo .................. H03M 1/361
                                                      341/159
2017/0004398 A1* 1/2017 Chen .................... G06N 3/0635

FOREIGN PATENT DOCUMENTS

| JP | 2013-143626 | 7/2013 |
| JP | 2014-96769 | 5/2014 |

* cited by examiner

FIG. 11

| $V_{dran}$ | $N_{var}[m]$ | $p[m]$ |
|---|---|---|
| -1 | 0 | 0 |
| +1 | 0 | 0 |
| -1 | 1 | -Vref |
| +1 | 1 | +Vref |

BOLTZMANN MACHINE, METHOD FOR CONTROLLING BOLTZMANN MACHINE, AND INFORMATION PROCESSING DEVICE HAVING BOLTZMANN MACHINE

CROSS-REFERENCE TO RELATED APPLICATION

This application is based upon and claims the benefit of priority of the prior Japanese Patent Application No. 2016-018668, filed on Feb. 3, 2016, the entire contents of which are incorporated herein by reference.

FIELD

The present invention relates to a Boltzmann machine, a method for controlling the Boltzmann machine, and an information processing device having the Boltzmann machine.

BACKGROUND

A Boltzmann machine as a type of neural network is expected to be capable of processing multivariable optimization and pattern recognition at high speed. The concept of the Boltzmann machine is that the configuration of a network is held equivalent to a thermodynamic system and it is ensured that an energy state reaches a thermal equilibrium state when sufficient time has elapsed, according to a Boltzmann distribution.

In relation to the Boltzmann machine, the Ising model is known that is a functional unit for determining an optimal solution stochastically and has a plurality of lattice points each having a spin status and links between the lattice points. Examples thereof are disclosed in Japanese Laid-open Patent Publication No. H2-27493 and Japanese Laid-open Patent Publication No. H4-18661. The Ising model is a lattice model that is constituted by the lattice points each having two orientation statuses and considers an interaction only with the adjacent lattice point. Japanese Laid-open Patent Publication No. 2014-96769 and Japanese Laid-open Patent Publication No. 2013-143626 are related prior arts.

SUMMARY

In the Boltzmann machine, in order to prevent the solution from falling into a local minimum value, a method called simulated annealing is used which, using a temperature parameter, changes a probability with which each lattice (unit) outputs+1.

In the conventional Boltzmann machine, in order to change the above probability, a noise is generated by a random noise generator, the amplitude of the generated noise is changed by an amplifier, and the output value of each lattice (unit) is thereby generated. With this, the probability that each lattice (unit) outputs+1 is changed using the temperature parameter. However, the circuit scale of the random noise generator is large and, since the magnitude of the generated noise is random, it is difficult to appropriately change the amplitude of the noise.

According to an aspect of the embodiments, Boltzmann machine includes a plurality of circuit units each of which has an adder that performs addition of a plurality of weighted input signals and a comparison unit that compares an output signal of the adder with a threshold signal to output a binary output signal; and a plurality of digital arithmetic units each of which generates each of the weighted input signals by weighting the binary output signal of a first circuit unit of a pair of the circuit units in the plurality of circuit units with a weight to output the weighted input signal to a second circuit unit of the pair of the circuit units, wherein the comparison unit has: a first comparator that compares a thermal noise with a reference voltage to output a binary digital random signal; a first DA converter that converts the digital random signal to an analog random signal, and varies a magnitude of the analog random signal; and a second comparator that input the analog random signal as the threshold signal, and compares the output signal of the adder with the threshold signal to generate the binary output signal with a predetermined probability function.

According to the above aspect, it is possible to vary the amplitude of the random noise with a small-scale circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a view illustrating a logical value table of the operation of a control circuit 10 in the first DA converter dndac.

DESCRIPTION OF EMBODIMENTS

Figure 1A:
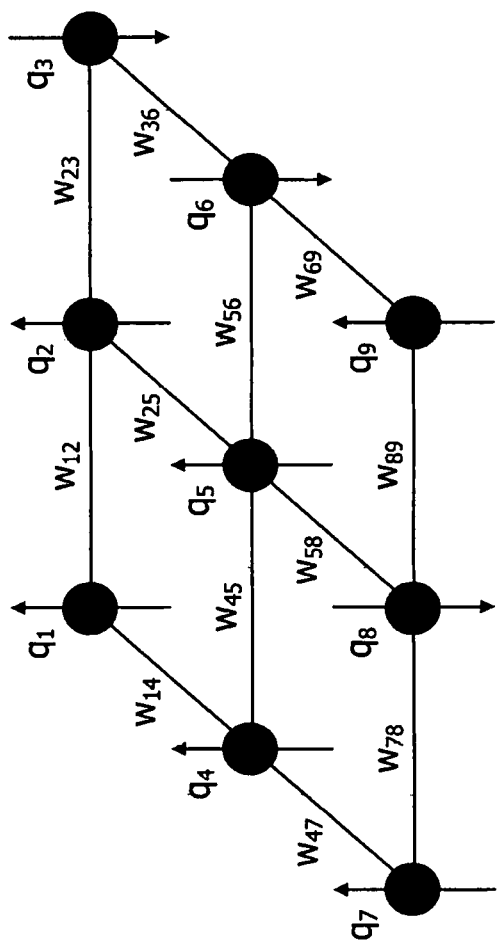
FIGS. 1A and 1B are views illustrating an example of the Ising model.
Figure 1B:
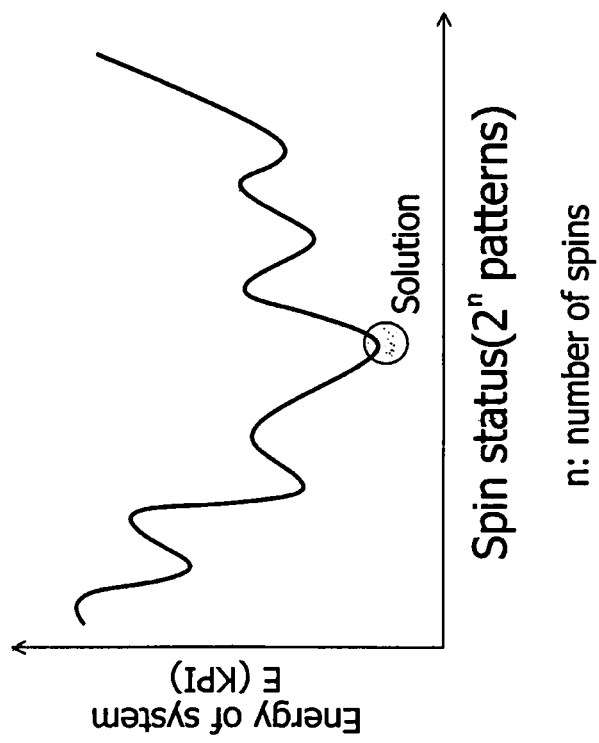

FIGS. 1A and 1B are views illustrating an example of the Ising model. FIG. 1A illustrates an example of the configuration of a model that represents the behaviors of magnetic spins, and FIG. 1B illustrates a graph that represents the relationship between energy E of a network and a combination pattern of the spin "Spin status".

The Ising model in FIG. 1A is a model that represents the behaviors of the magnetic spins, and is constituted by nine lattice points each having two orientation statuses. When it is assumed that each of the two orientation statuses of each lattice point is a spin q, an interaction coefficient between the adjacent lattice points, i.e., a weight of coupling is w, and an external magnetic field coefficient, i.e., the force of a magnetic field given to each lattice point from the outside is b, the formula of the energy of the network is defined by the following Math. 1.

$$E = -\sum_{<i,j>} w_{ij} q_i q_j - \sum_j b_j q_j \quad \text{[Math. 1]}$$

Herein, the value of the spin q is +1 when the orientation of the spin is an upward orientation and is −1 when the orientation thereof is a downward orientation, and a spin $q_i$ of a given lattice point is subjected to an interaction of a spin $q_j$ of the adjacent lattice point with the weight of an interaction coefficient $w_{ij}$. In addition, in Math. 1, <i, j> means a combination of i and j and, e.g., <1, 2> and <2, 1> are not duplicated because there are the same combination.

In the graph in FIG. 1B, the horizontal axis indicates the combination pattern of the spin, the vertical axis indicates energy E of the network, and a point that minimizes the energy (Solution) indicates an optimal state. By determining the pattern of the spin at the point that minimizes the energy, it is possible to obtain an optimal solution.

Next, a description will be given of a method for determining the optimal solution at the point that minimizes the energy in the case where the formula in Math. 1 above is defined as the energy of the network.

Figure 2B:
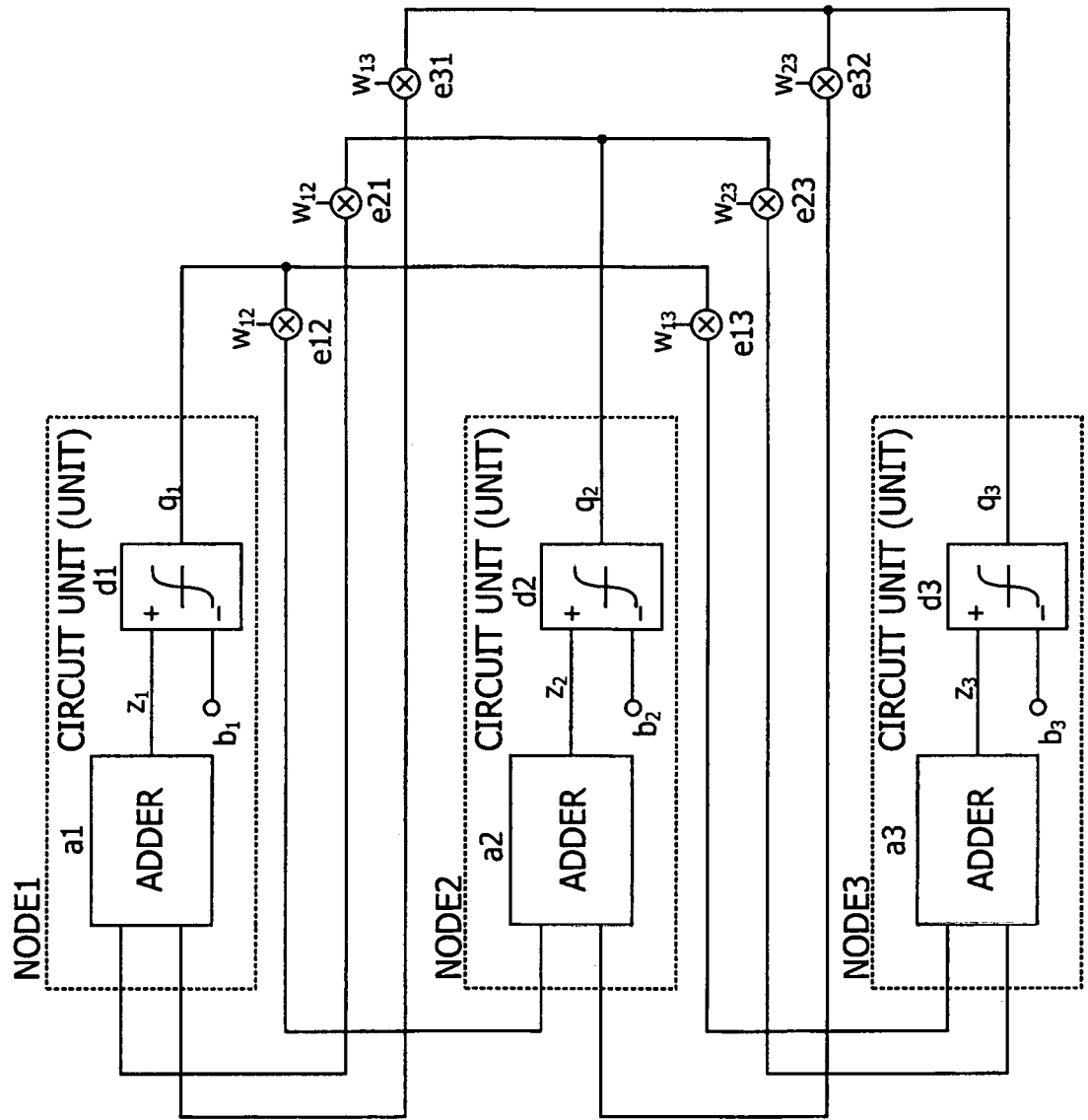
FIGS. 2A and 2B are views illustrating the Ising model of an undirected graph of three lattice points and a network circuit corresponding thereto.
Figure 2A:
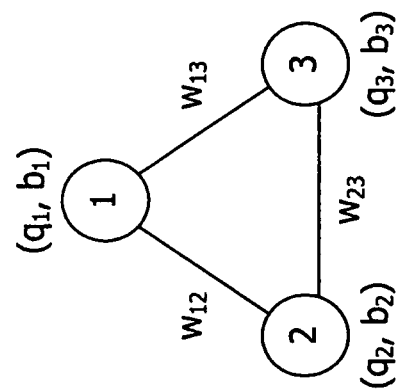

FIGS. 2A and 2B are views illustrating the Ising model of an undirected graph of three lattice points and a network circuit corresponding thereto. For simplifying the description, consideration will be given to a model that has three lattice points (nodes) and interactions (links) illustrated in FIG. 2A.

A node i has a spin status $q_i$ and a bias $b_i$ ($q_i$, $b_i$), and i=1, 2, or 3 is satisfied. The link has a weight w and, since the model is an undirected model, the weight of the link that connects the node i and a node j is $w_{ij}$, and a link weight $w_{ii}$ to the node i satisfies $w_{ii}=0$. In addition, the weight $w_{ij}$ that acts on the link $j$ by the link i is equal to a weight $w_{ji}$ that acts on the link i by the link j.

Herein, according to Math. 1 described above, the energy of the network is defined. The energy E in Math. 1 in the model of three lattice points in FIG. 2A is as follows:

$$E = -(w_{12}q_1q_2 + w_{13}q_1q_3 + w_{23}q_2q_3) - (b_1q_1 + b_2q_2 + b_3q_3). \quad \text{[Math. 2]}$$

New energy E' of the network in the case where only the spin $q_1$ of the node 1 is inverted and changed to a new spin $q'_1$ ($=-q_1$) is as follows:

$$E' = -(w_{12}q'_1q_2 + w_{13}q'_1q_3 + w_{23}q_2q_3) - (b_1q'_1 + b_2q_2 + b_3q_3). \quad \text{[Math. 3]}$$

Consequently, a change amount ΔE=E'−E of the energy when only the spin $q_1$ of the node 1 is inverted and changed to the new spin $q'_1$ ($=-q_1$) is as follows, by simplifying the calculation formula of ΔE based on $q'_1=-q_1$:

$$\begin{aligned}\Delta E = E' - E &= -w_{12}q'_1q_2 - w_{13}q'_1q_3 + w_{12}q_1q_2 + \\ &\quad w_{13}q_1q_3 - b_1q'_1 + b_1q_1 \\ &= -2q'_1(w_{12}q_2 + w_{13}q_3 + b_1)\end{aligned} \quad \text{[Math. 4]}$$

When the formula in Math. 4 described above is generalized based on $q_1=q_i$, the formula is as follows:

$$\Delta E = -2q'_i(\Sigma_j w_{ij}q_j + b_i). \quad \text{[Math. 5]}$$

j is all numbers except for i.

From the formula of the change amount ΔE of the energy in Math. 5, it can be said that, when the sign of the new spin status $q'_i$ of a given node i matches the sign of $\Sigma_j w_{ij}q_j+b_i$ determined in the original spin status, the energy of the network is reduced. From this, by configuring an arithmetic circuit that causes the sign of the new spin status $q'_i$ of the given node i to match the sign of $\Sigma_j w_{ij}q_j+b_i$ determined in the original spin status, it is possible to gradually reduce the energy E of the network and eventually obtain the smallest value that satisfies ΔE=0. The combination pattern of the spins $q_i$ of the individual nodes when the smallest value of the energy E is obtained is the optimal solution of the model to be determined.

FIGS. 2A and 2B illustrate an arithmetic circuit that reduces the network energy E described above for the model of three nodes NODE 1-3. In the arithmetic circuit, the three nodes are constituted by adders a1, a2, and a3 that weight the spins q of the adjacent nodes with the interaction coefficient w between the nodes and perform addition of the spins q, and comparators d1, d2, and d3 that compare outputs z1, z2, and z3 of the adders with values of biases b1, b2, and b3 (to be accurate, values obtained by inverting the sign of the bias), and output the spins q. The individual comparators d1, d2, and d3 operate with different clocks.

For example, in the adder d1 of the node 1, the following addition is performed:

$$z_1 = w_{12}q_2 + w_{13}q_3 \quad \text{[Math. 6]}$$

Therefore, the adder of each node performs the following addition in general:

$$z_i = \Sigma_j w_{ij} q_j \quad \text{[Math. 7]}$$

A comparator $d_i$ of the arithmetic circuit compares an addition result $z_i$ with the value of $-b_i$ obtained by inverting the sign of a bias $b_i$, and outputs a comparison result $q'_i=+1$ or −1. That is, the operation of the comparator is as follows:
the comparator $d_i$ outputs $q'_i=+1$ when $z_i>-b_i$, and the comparator $d_i$ outputs $q'_i=-1$ when $z_i<-b_i$.

When the above inequalities are modified, the operation of the comparator is as follows:
the comparator $d_i$ outputs $q'_i=+1$ when $z_i+b_i>0$, and
the comparator $d_i$ outputs $q'_i=-1$ when $z_i+b_i<0$.

According to Math. 7, the left side of the inequalities is as follows:

$$z_i + b_i = \Sigma_j w_{ij} q_j + b_i$$

Therefore, it follows that the comparator $d_i$ of the arithmetic circuit performs the following comparison operation:

the comparator $d_i$ outputs $q'_i = +1$ when $\Sigma_j w_{ij} q_j + b_i > 0$, and
the comparator di outputs $q'_i = -1$ when $\Sigma_j w_{ij} q_j + b_i < 0$.

That is, this means that the comparator $d_i$ implements the match between the sign of $q'_i$ and the sign of $\Sigma_j w_{ij} q_j + b_i$ as the condition for the reduction of the energy change $\Delta E$, and hence the state of the smallest value of the energy E of the network (a state in which $\Delta E = 0$ is satisfied) can be determined by the arithmetic circuit in FIG. 2. That is, the operation of the comparator $d_i$ and the change of the energy E are as follows:

when $\Sigma_j w_{ij} q_j + b_i > 0$, since the comparator $d_i$ outputs $q'_i = +1$, both of the signs are positive signs and the energy is reduced, when $\Sigma_j w_{ij} q_j + b_i < 0$, since the comparator $d_i$ outputs $q'_i = -1$, both of the signs are negative signs and the energy is reduced, and, when the operation is repeated until $\Delta E = \Sigma_i \{-2q'_i (\Sigma_j w_{ij} q_j + b_i)\} = 0$ is satisfied, the energy E reaches the smallest value. Alternatively, by repeating the operation, $\Delta E$ approaches 0, and the energy E reaches a value close to the smallest value.

Consequently, in the arithmetic circuit in FIG. 2, when the operation for inverting the status of the spin q of a given node is repeated randomly, the change amount of the energy approaches $\Delta E = 0$ in a certain time, and the energy E can reach the state having the value close to the smallest value.

However, when the spin $q'_i$ is definitely determined, it is not possible to escape from a local solution. To cope with this, by introducing the operation for stochastically determining the spin $q'_i$ into the comparator $d_i$, the comparator $d_i$ is allowed to operate so as to increase the energy, and it becomes possible to escape from the local solution and reach the minimum value (optimal solution) close to the smallest value. By using an annealing method in which the stochastic degree shifts from a high state to a low state, the energy can be caused to reach the minimum value close to the smallest value.

Specifically, as will be described later, by adding a noise to a threshold $-b_i$, the comparator $d_i$ is caused to perform an operation for outputting $q'_i = -1$ even when $\Sigma_j w_{ij} q_j + b_i > 0$, and outputting $q'_i = +1$ even when $\Sigma_j w_{ij} q_j + b_i < 0$, and the energy E is thereby increased.

That is, when the comparators $d_i$ of the three nodes are caused to operate in random order, every time an operation for causing the sign of $\Sigma_j w_{ij} q_j + b_i$ to match the sign of $q'_i$ is performed, the energy E is reduced. However, by adding the noise to the threshold $-b_i$, the comparator $d_i$ malfunctions, and increases the energy E. By the operation that increases the energy, the energy is allowed to escape from the local solution.

FIG. 3 is a view illustrating the annealing of the Boltzmann machine. As a method for deriving the optimal solution that minimizes the energy E, there is a method that determines the solution by the annealing (a method called annealing in metallurgical engineering). In the annealing, by slowly cooling metal or glass after heating the metal or glass to an appropriate temperature, an internal distortion thereof is removed. When the temperature of heat is high, atoms remain in a high-energy state but, by the slow cooling, the atoms transition such that the energy becomes lower than that in an initial state, and crystals are stabilized.

The horizontal axis in FIG. 3 corresponds to the combination pattern of the spin q, and the vertical axis therein corresponds to the energy E. In addition, a curve represents the energy E of the network, and a point MIN represents the smallest energy and is the optimal solution. The minimum value of each of points other than the point MIN is the local minimum value of the energy, and indicates the local solution. Normally, in a method such as a steepest descent method or the like, the energy does not move so as to be higher, and hence, once the energy falls into the local solution, it is not possible to escape from the local solution. However, in the Boltzmann machine, by addition of a thermal noise, the energy can be stochastically changed so as to be higher to a certain extent, therefor, the energy can escape from the local solution.

Figure 3A:
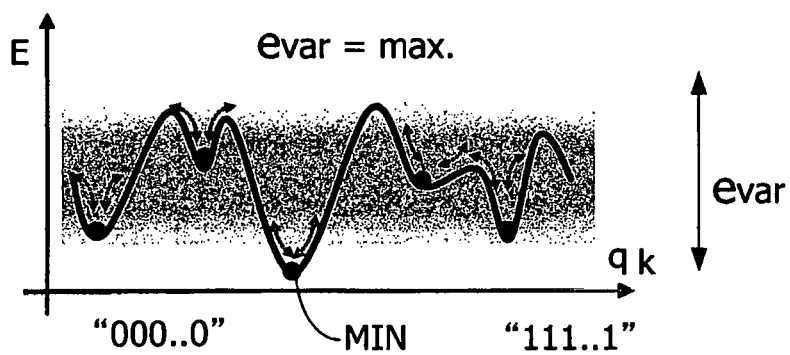
FIGS. 3A-3C are views illustrating the annealing of the Boltzmann machine.
Figure 3B:
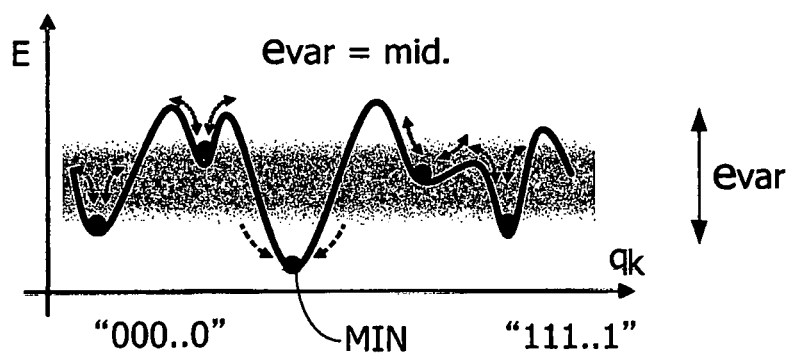
Figure 3C:
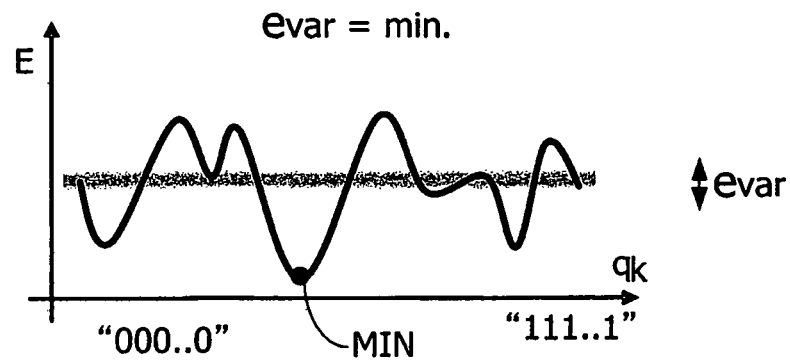

In FIG. 3, the range of the changeable energy is indicated by $e_{var}$. The range of the changeable energy $e_{var}$ is illustrated conceptually, and is not directly related to the curve indicative of the energy E. In FIG. 3, when the temperature is high as in FIG. 3A, since the thermal noise is large, the range of the changeable energy $e_{var}$ is maximized, the optimal solution MIN is included, and it is possible to escape not only from the local solution but also even from the optimal solution MIN. When the temperature is reduced and the thermal noise is reduced to be medium, as illustrated in FIG. 3B, the range of the changeable energy $e_{var}$ become a medium range, the optimal solution MIN is not included, and it is possible to escape from other local solutions although it is not possible to escape from the optimal solution MIN. When this state is continued, a possibility that the optimal solution MIN is achieved is increased rapidly. Further, when the temperature is reduced and the thermal noise is minimized, as illustrated in FIG. 3C, the range of the changeable energy $e_{var}$ is minimized, and the transition of the energy gradually ceases.

Consequently, in the arithmetic circuit in FIG. 2, when the degree of the stochastic operation of each of the comparators d1, d2, and d3 is gradually reduced while the operation for inverting the status of the spin q of a given node is repeated randomly, the energy E of the network can be expected to reach the optimal solution MIN as the smallest value (or a suboptimal solution of a value close to the smallest value) after the repetition of the predetermined number of times. This control of the degree of the stochastic determination is implemented by controlling the gradient of a sigmoid function as an output function of the comparators $d_i$ using the magnitude of the thermal noise.

Figure 4:
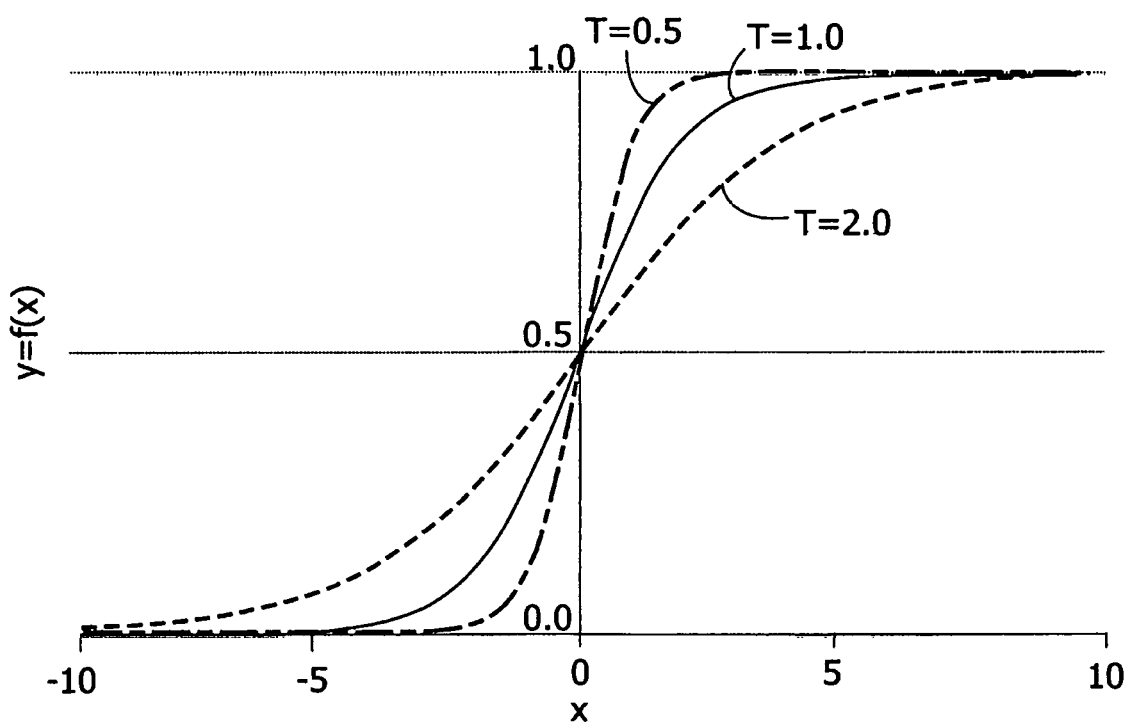
FIG. 4 is a view illustrating the sigmoid function.

FIG. 4 is a view illustrating the sigmoid function. The horizontal axis corresponds to an input x (an input z of the comparator $d_i$), and the vertical axis corresponds to a probability f(x) that the output q of the comparator $d_i$ is +1. FIG. 4 illustrates that the probability f(x) that the output q is +1 when the input x of the comparator is compared with a threshold 0 (herein, the threshold b=0) approaches 1.0 in the case where the input x is larger than the threshold 0, and approaches 0.0 in the case where the input x is smaller than the threshold 0. This function f(x) is the sigmoid function. The threshold 0 corresponds to the threshold b of the comparator $d_i$.

The sigmoid function is often used for representing the characteristic of the annealing. As described above, the comparator $d_i$ receives the input x and, when the input x exceeds the threshold b (b=0 in FIG. 4), the comparator $d_i$ outputs +1 with a given possibility f(x). The function f(x) is illustrated in FIG. 4 and, x represents an input value, and T represents a temperature parameter.

FIG. 4 illustrates three graphs with the temperatures T of 0.5, 1, and 2. When the temperature is high like T=2, the gradient of the function f(x) is gradual and, even in the case where the input x deviates from the threshold 0, the probability that the output is +1 is gradually increased or reduced. This state corresponds to FIG. 3A described above. When the temperature T is gradually reduced, the gradient of the function f(x) gradually becomes steep and, in the case where the input x deviates from the threshold 0, the probability that the output is +1 immediately becomes 1.0 or 0.0. This corresponds to FIG. 3B or FIG. 3C described above. Thus, by implementing the change of the characteristic of the sigmoid function f(x) on the circuit, the annealing is allowed.

Present Embodiment

Figure 5:
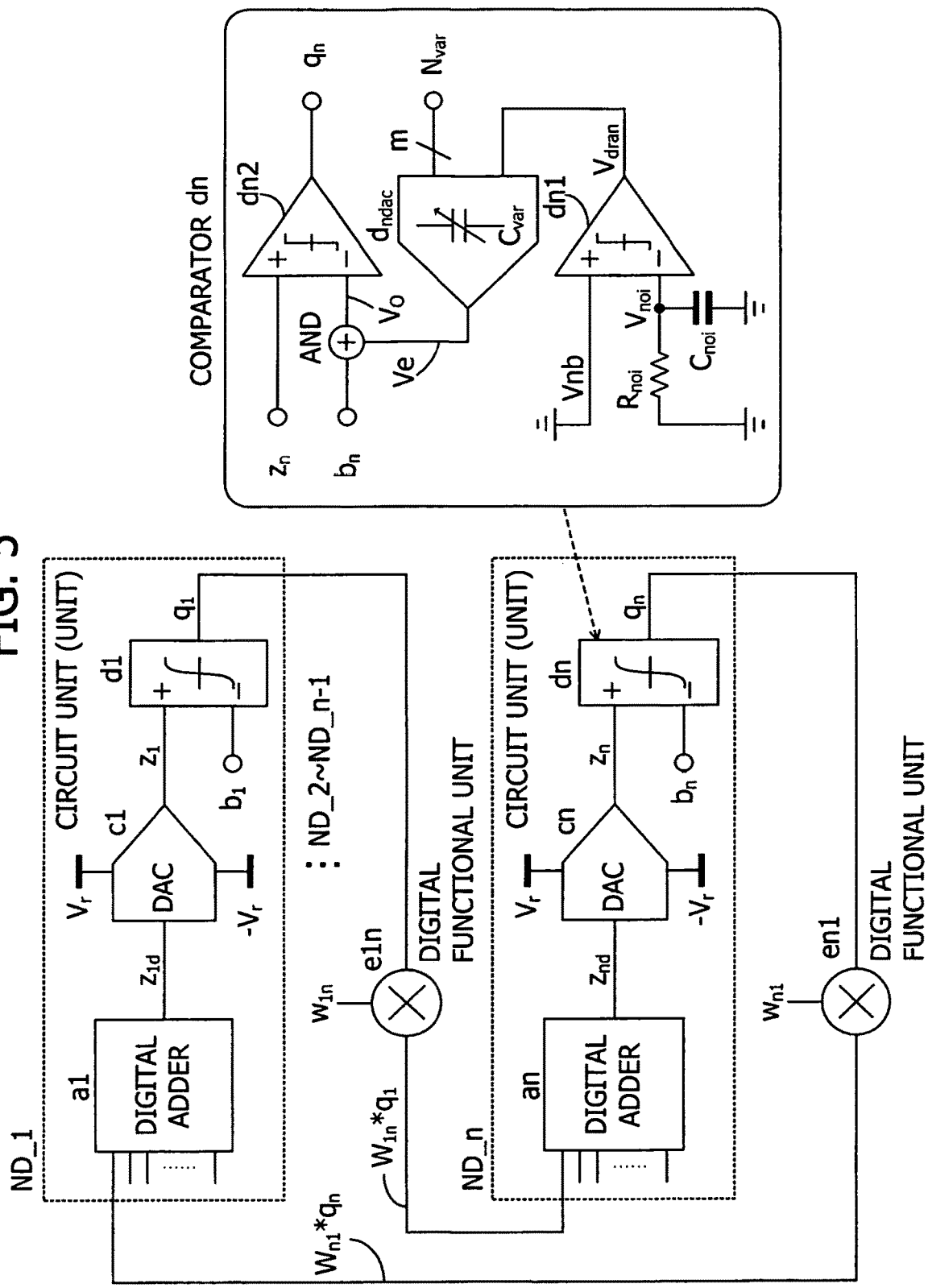
FIG. 5 is a view illustrating the arithmetic circuit of the Ising model in the present embodiment.

Hereinbelow, the arithmetic circuit of the Ising model of the present embodiment will be described. FIG. 5 is a view illustrating the arithmetic circuit of the Ising model in the present embodiment. The arithmetic circuit in FIG. 5 has a configuration obtained by generalizing the arithmetic circuit for the model of three nodes illustrated in FIG. 2. That is, the arithmetic circuit in FIG. 5 corresponds to the Ising model having the node 1 to the node n illustrated in FIG. 1. Note that FIG. 5 illustrates the node 1 and the node n only, and the configuration of the remaining nodes is omitted.

A circuit unit of a node ND_1 has a digital adder a1 that performs addition of $q_i^* w_{i1}$ obtained by multiplying the spin $q_i$ of the adjacent node that exerts the interaction on the node ND_1 by the corresponding weight $w_{i1}$, a DA converter c1 that performs DA conversion of a digital output $z_{1d}$ of the digital adder, and a comparator d1 that compares an analog output $z_1$ with the threshold $b_i$ and outputs the spin $q_1$. When the threshold b1 is assumed to be 0, the spin $q_1$ is +1 or −1. Similarly to the node ND_1, the circuit unit of a node ND_n has a digital adder an, a DA converter cn, and a comparator (comparison unit) dn.

In addition, the arithmetic circuit has a digital arithmetic unit $e_{ij}$ that multiplies the spin $q_i$ as the output of each node by the corresponding weight $w_{ij}$ ($e_{1n}$ and $e_{n1}$ are illustrated in FIG. 5).

FIG. 5 illustrates the detailed configuration of the comparator (or the comparison unit) dn of the node ND_n. The comparator (or the comparison unit) dn has a first comparator dn1, a first DA converter dndac, and a second comparator dn2. The first comparator dn1 compares a thermal noise Voi with a reference voltage Vnb, and outputs a binary digital random signal (Vdran). The first DA converter dndac converts the digital random signal Vdran to an analog random signal Ve, and varies the magnitude of the analog random signal Ve based on an amplitude control signal Nvar. The second comparator dn2 adds the analog random signal Ve to a threshold signal bn and input the resulting signal bn+Ve, compares a threshold signal Vo (=bn+Ve) with an output signal $z_n$ of the digital adder an, and generates a binary output signal $q_n$ with a predetermined probability function.

A constant voltage Vnb (=GND) is input to the positive input of the first comparator dn1, and a noise voltage Vnoi of the thermal noise generated in a resistor Rnoi is input to the negative input of the first comparator dn1. A capacitance Cnoi is, e.g., a parasitic capacitance of the negative input terminal. In addition, the amplitude control signal Nvar is an m-bit digital amplitude control signal. An analog output $z_n$ of the second DA converter cn, which is obtained by converting a digital output $z_{nd}$ of the digital adder an, is input to the positive input of the second comparator dn2, and the threshold signal Vo=bn+Ve is input to the negative input of the second comparator dn2.

Figure 6A:
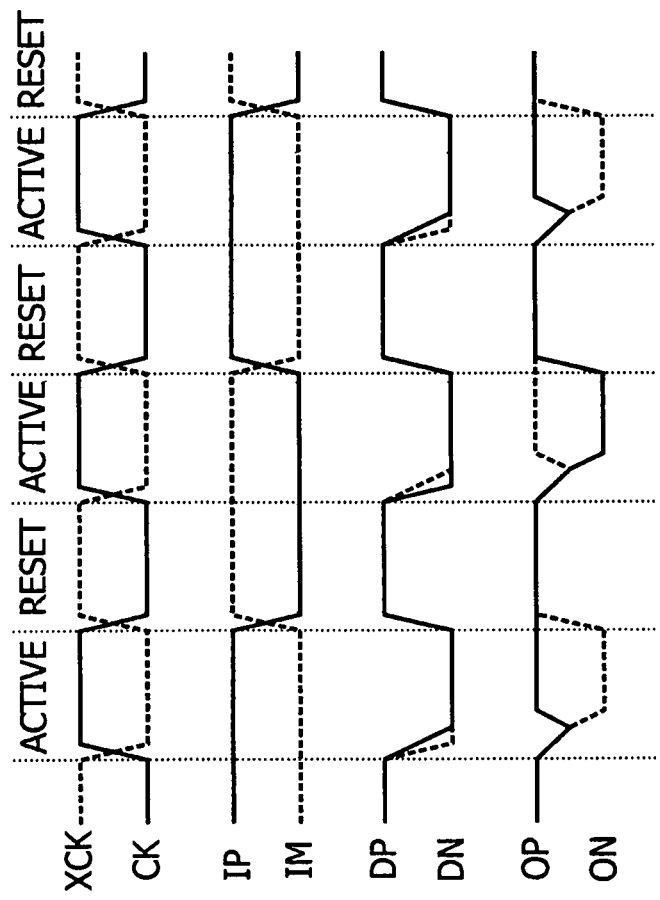
FIGS. 6A and 6B are views illustrating an example of the circuit of the comparator and the operation thereof.
Figure 6B:
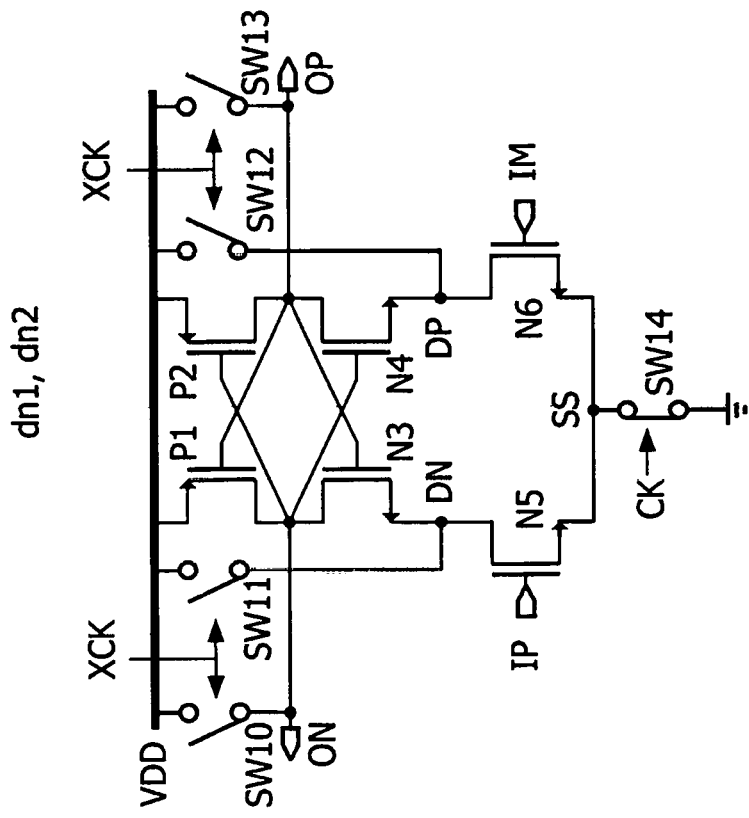

FIGS. 6A, 6B are views illustrating an example of the circuit of the comparator and the operation thereof. FIG. 6A illustrates the example of the circuit of the first comparator dn1 or the second comparator dn2 on the left side. The comparator is a dynamic latch comparator that operates in synchronization with a clock CK. The clock CK is supplied to a gate of a switch SW14, an inverted clock XCK is supplied to each of control terminals of switches SW10, SW11, SW12, and SW13, and each of the switches is turned ON when the clock or the inverted clock is at an H level, and is turned OFF when the clock or the inverted clock is at an L level.

The comparator has an NMOS transistor N5 to the gate of which a positive input signal IP is supplied, and an NMOS transistor N6 to the gate of which a negative input signal IM is input, and has a switch SW14 between a ground GND and a source SS that are shared by the transistors N5 and N6. Further, the comparator has PMOS and NMOS transistor pairs P1 and N3 and P2 and N4 between drains DN and DP of the transistors N5 and N6 and a power source voltage VDD, and gates and drains of the transistor pairs P1 and N3 and P2 and N4 are cross-connected to configure a latch circuit. In addition, drains of the transistor pairs P1 and N3 and P2 and N4 are connected to a negative output ON and a positive output OP respectively.

When the clocks CK=L and XCK=H are satisfied, the switches SW10, SW11, SW12, and SW13 are turned ON and the switch SW14 is turned OFF, and the comparator is reset. In the reset state, the drain nodes DN and DP are connected to the power source voltage VDD, and the output terminals ON and OP are also connected to the power source voltage VDD. When the clocks CK=H and XCK=L are satisfied, the switches SW10, SW11, SW12, and SW13 are turned OFF and the switch SW14 is turned ON, and the input transistors N5 and N6 compare the input signals OP and IM with each other. In the case where IP>IM is satisfied, the transistor N5 is brought into conduction more strongly than the transistor N6, the reduction of the drain node DN is larger than that of the drain node DP, and DN<DP is satisfied. Subsequently, this state is latched by the latch circuit constituted by the transistor pairs P1 and N3 and P2 and N4, and the output signals satisfy ON<OP. In the case where IP<IM is satisfied, the above operation is reversed.

The comparison circuit in FIG. 6 is only exemplary, and the comparison circuit having another configuration may also be used.

Figure 7:
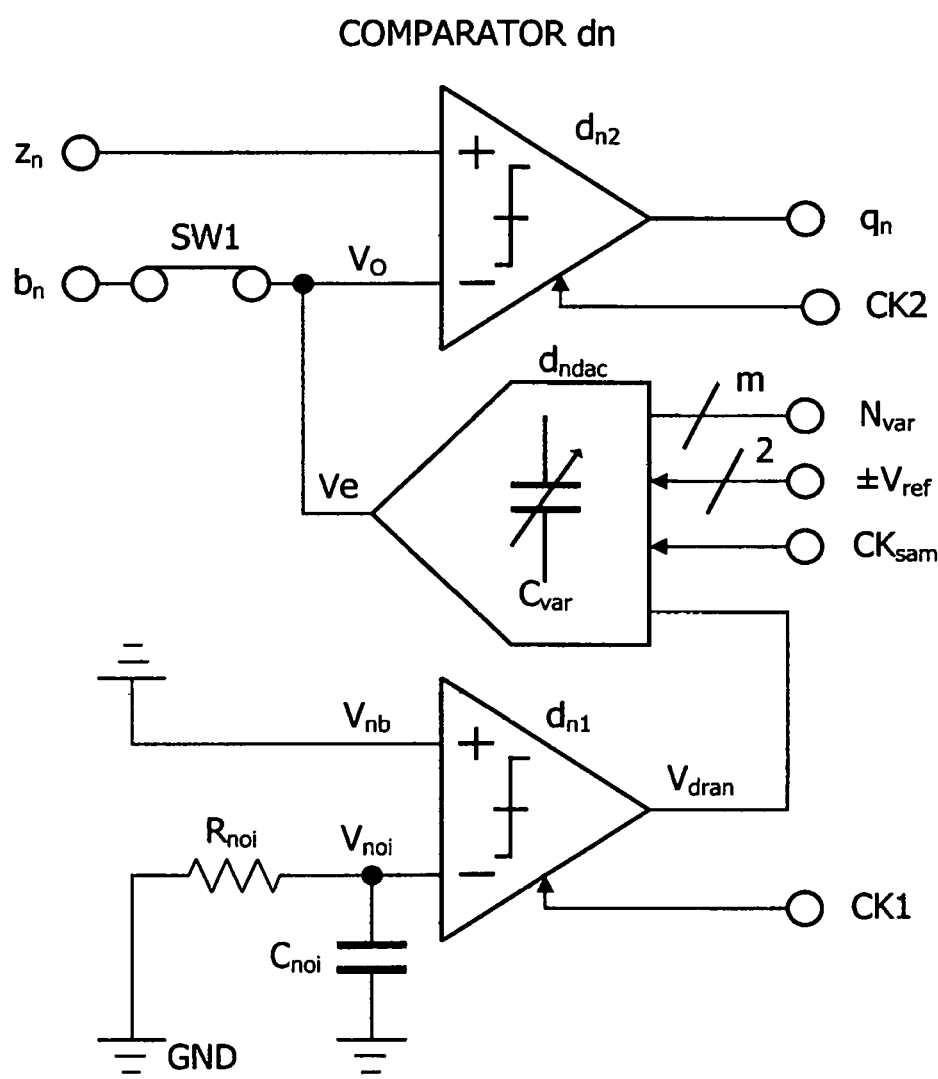
FIG. 7 is a view illustrating the configuration of the comparator (comparison unit) dn.

FIG. 7 is a view illustrating the configuration of the comparator (comparison unit) dn. The configuration is the same as the configuration of the comparator in FIG. 5 but, in an example in FIG. 7, a clock CK1 is supplied to the first comparator dn1, a clock CK2 is supplied to the second comparator dn2, and, in addition to the amplitude control signal Dvar, a sample clock CKsam and positive and negative reference voltages +Vref and −Vref are input to the DA converter dndac. The DA converter dndac is a capacitance DAC that uses capacitative elements, and the capacitance value of the capacitive elements is varied and the amplitude of the analog output signal Ve is varied with the amplitude control signal Dvar.

Next, a description will be given of the operation for generating the digital random signal Vdran based on the thermal noise Vnoi by the first comparator dn1.

Figure 8:
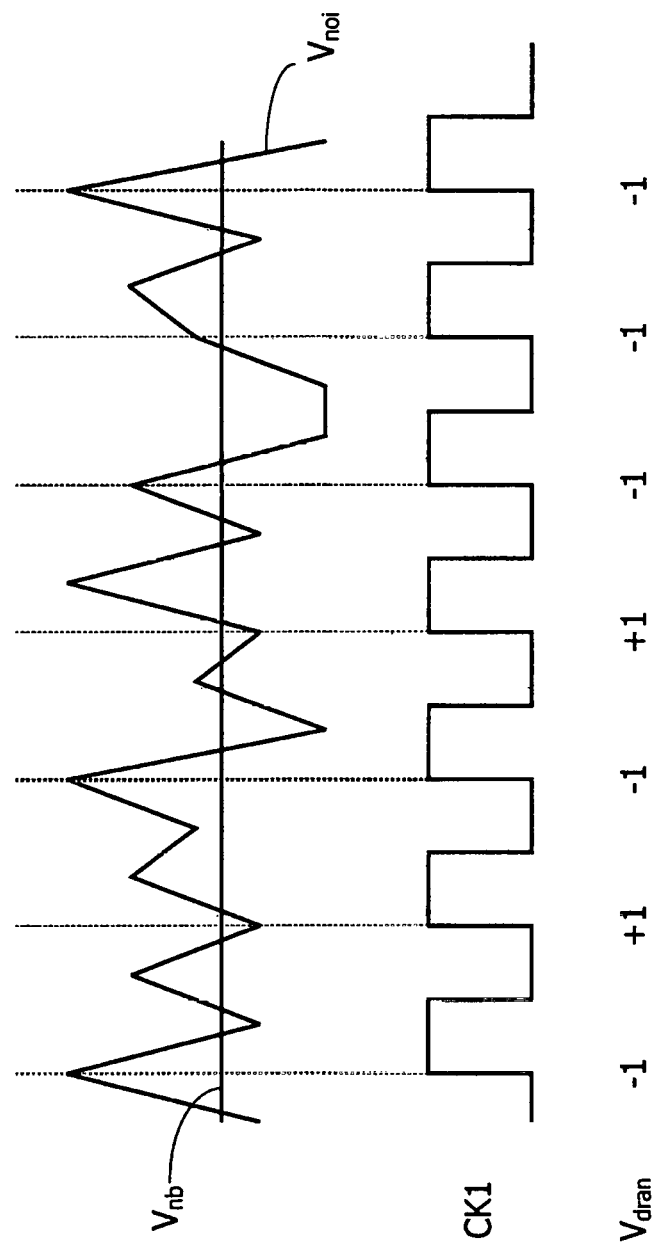
FIG. 8 is a view illustrating the signal waveform of the operation of the first comparator.

FIG. 8 is a view illustrating the signal waveform of the operation of the first comparator. When the thermal noise is generated in the semiconductor region of the resistor Rnoi connected to the negative input of the first comparator dn1, charges flow into the parasitic capacitance Cnoi, and the thermal noise voltage Vnoi fluctuates. That is, the resistor Rnoi and the capacitance Cnoi constitute a thermal noise generation circuit. The thermal noise is generated at random timings, and hence the thermal noise voltage Vnoi fluctuates randomly.

The first clock CK1 is input to the first comparator, and the first comparator dn1 outputs the comparison result of the thermal noise voltage Vnoi and the constant voltage Vnb as the digital random signal Vdran that has +1 (Vnb>Vnoi) or −1 (Vnb<Vnoi) at the rising edge of the first clock CK1. Thus, the digital random signal Vdran is the sign of +1 or −1, and is a sign noise that changes randomly. As described above, the first comparator dn1 converts the weak analog random noise Vnoi to the digital random signal Vdran.

Figure 9:
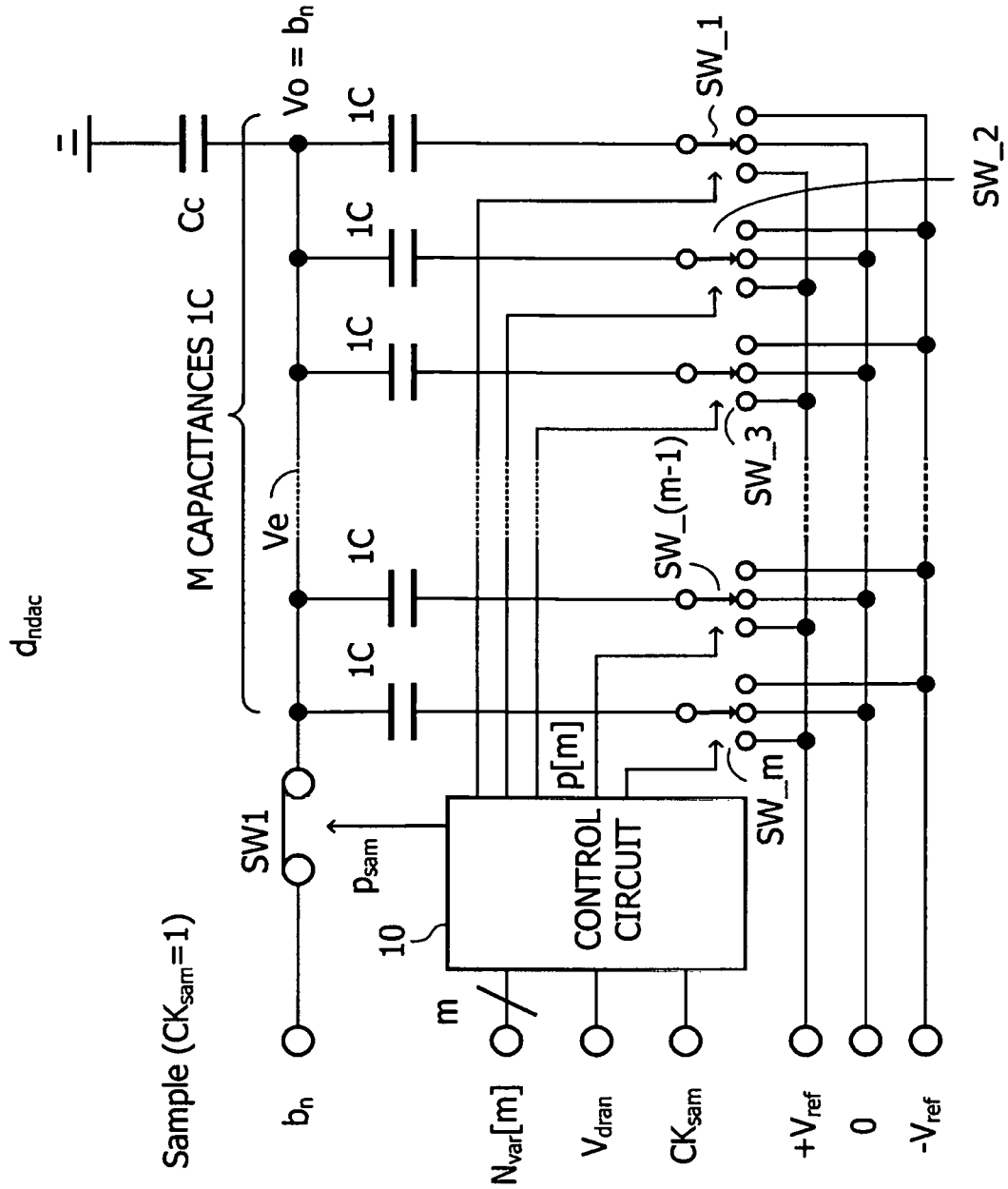
FIG. 9 is a view illustrating a sampling operation of the first DA converter dndac.
Figure 10:
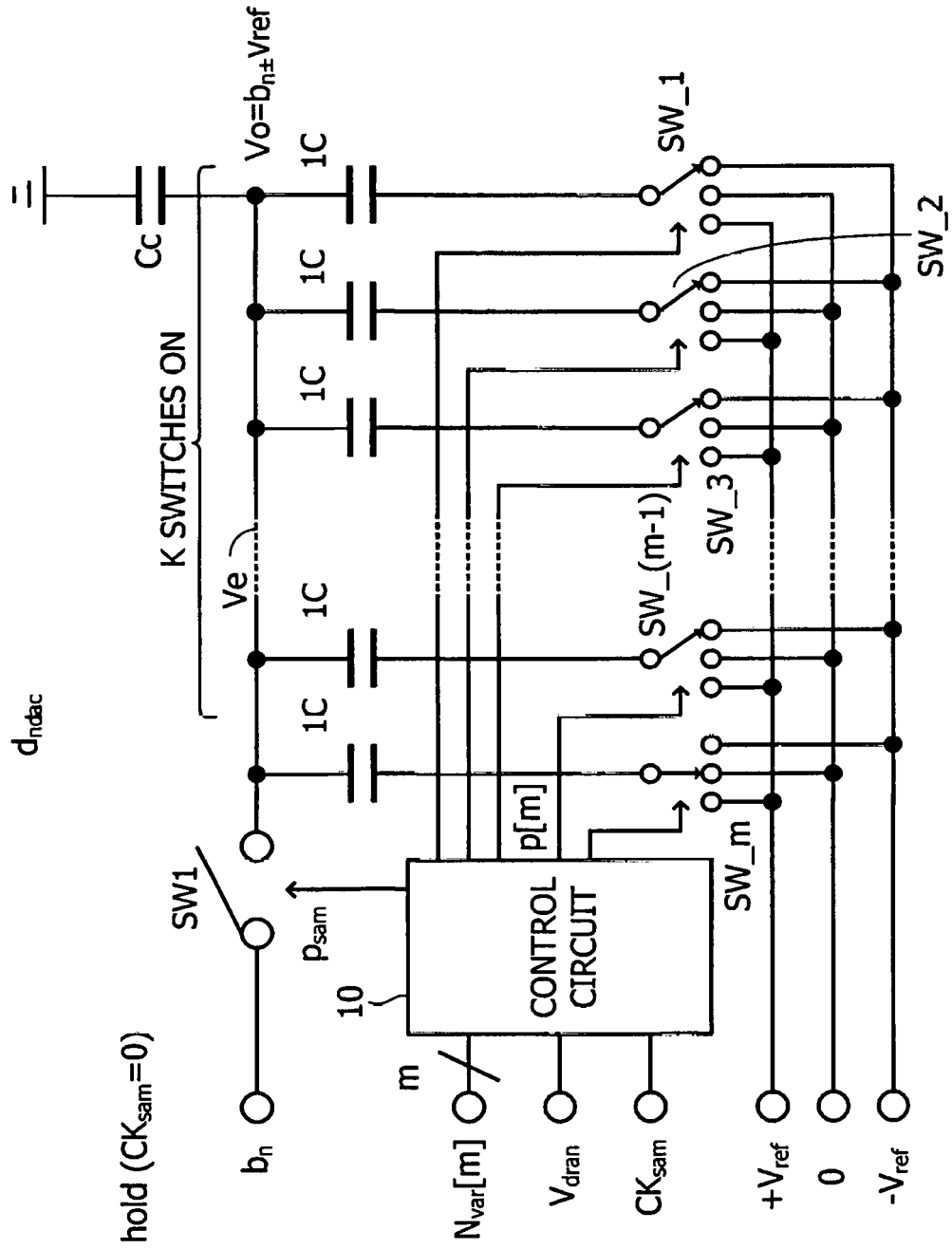
FIG. 10 is a view illustrating a hold operation of the first DA converter dndac.
Figure 11:
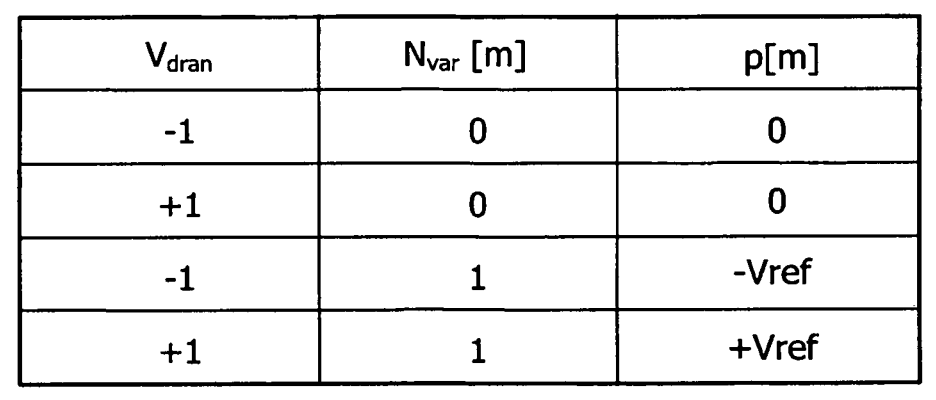
Figure 12:
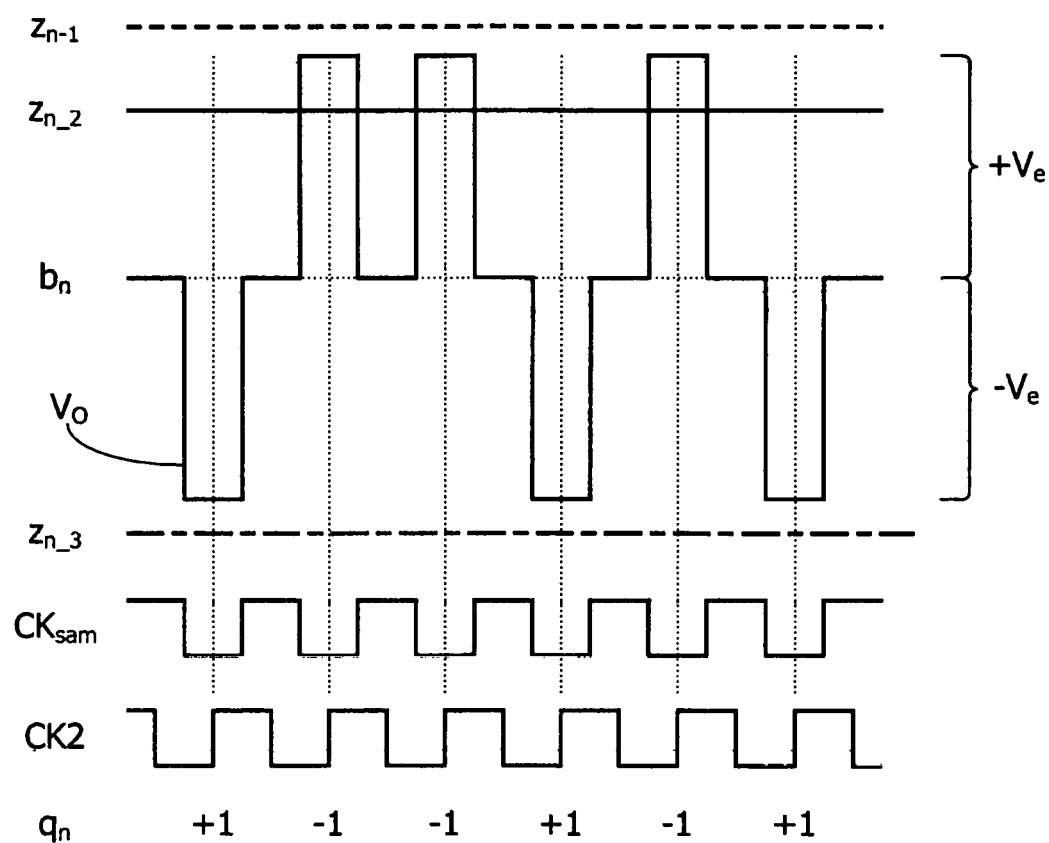
FIG. 12 is a view illustrating the signal waveform of the operation of each of the first DA converter dndac and the second comparator dn2.

FIGS. 9 and 10 are views illustrating a sampling operation and a hold operation of the first DA converter dndac. FIG. 11 is a view illustrating a logical value table of the operation of a control circuit 10 in the first DA converter dndac. In addition, FIG. 12 is a view illustrating the signal waveform of the operation of each of the first DA converter dndac and the second comparator dn2.

The first DA converter dndac illustrated in each of FIGS. 9 and 10 has m capacitances 1C (to be accurate, a capacitor having capacitance 1C, hereinafter referred to as the capacitance 1C) each having one electrode connected to the node at which the analog random signal Ve is generated, and switches SW_1 to SW_m connected to the other electrodes of the capacitances 1C respectively. Each of the switches SW_1 to SW_m connects the node of the reference voltage +Vref, the reference voltage −Vref, or a ground voltage 0 volt to the other electrode of each of the capacitances 1C based on an m-bit control signal p[m]. The control circuit 10 receives the m-bit amplitude control signal Dvar[m] that controls the amplitude of the noise, the digital random signal Vdran, and the sample clock CKsam, and generates the control signal p[m] for each of the switches SW_1 to SW_m. In the drawing, a capacitance Cc is an input terminal capacitance of the second comparator dn2, and the capacitance value thereof is very small as compared with that of the capacitance 1C.

As illustrated in FIG. 9, when the sample clock $CK_{sam}$ is in a sampling mode in which $CK_{sam}=1$ is satisfied, a control signal $p_{sam}$ of a switch SW1 satisfies $p_{sam}=1$, the switch SW1 is turned ON, and the threshold voltage bn is sampled in all of the capacitances 1C. The control circuit 10 controls the m-bit control signals p[m] such that the switches SW_1 to SW_m are connected to the ground 0 in synchronization with $CK_{sam}=1$. With this, the threshold voltage bn is applied to all of the capacitances C1, and the voltages thereof are sampled. During a sampling period, an input voltage Vo of the second comparator satisfies Vo=bn.

Next, as illustrated in FIG. 10, when the sample clock $CK_{sam}$ is in a hold mode in which $CK_{sam}=0$ is satisfied, the control signal $p_{sam}$ of the switch SW1 satisfies $p_{sam}=0$, the switch SW1 is turned OFF, the node to which the analog random signal Ve is output or the node of the input voltage Vo of the second comparator dn2 is brought into a floating state.

As indicated by the logical value table in FIG. 11, the control circuit 10 controls the control signal p[m] as +Vref or −Vref based on the fact that, the digital random signal Vdran is +1 or −1, when the m-bit-th amplitude control signal Nvar[m] is 1. That is, the switch SW_m is connected to the positive reference voltage +Vref or the negative reference voltage −Vref when the control signal p[m] is +Vref or −Vref. That is, when the amplitude control signal Nvar[m] is 1, the switch SW_m is connected to the positive reference voltage +Vref in the case where the digital random signal satisfies Vdran=+1, and the switch SW_m is connected to the negative reference voltage −Vref in the case where the digital random signal satisfies Vdran=−1.

On the other hand, when the m-bit-th amplitude control signal Nvar[m] is 0, the control circuit 10 controls the control signal p[m] such that the switch SW_m is connected to the node of 0 V irrespective of whether the digital random signal Vdran is +1 or −1.

When k bits of m-bit amplitude control signals Nvar are 1, k switches out of the switches SW_1 to SW_m are connected to the positive reference voltage +Vref or the negative reference voltage −Vref based on Vdran=+1 or −1. As a result, the output Vo of the DA converter dndac (or the threshold input of the second comparator) is a voltage described below that is obtained by adding a fluctuation range ±Ve to the threshold voltage bn.

$$Vo=bn\pm Ve$$

$$Ve=\{kC/(mC+Cc)\}Vref$$

Herein, k is the number of ones of Nvar, and m is the number of the capacitances 1C.

When the input terminal capacitance Cc is ignored because it is very small, the output Vo is as follows:

$$Ve=(k/m)*Vref$$

$$Vo=bn\pm Ve=bn\pm(k/m)*Vref$$

That is, the output Vo is the voltage obtained by adding the fluctuation value±Ve having the same sign as that of the digital random signal Vdran to the threshold bn, and the fluctuation range (amplitude) is a voltage range obtained by multiplying the reference voltage Vref by the number of ones (k) of the amplitude control signal Nvar (k times). Consequently, the first DA converter dndac converts the digital random signal Vdran generated based on the thermal noise to the analog random signal Ve. The amplitude of the analog random signal Ve can be varied with the amplitude control signal Nvar.

As illustrated in FIG. 12, in synchronization with the second clock CK2, the second comparator dn2 compares the analog output $z_n$ obtained by converting the digital output $z_{nd}$ of the digital adder an with the input voltage Vo=bn±Ve on which the noise having a predetermined amplitude is superimposed, and sets the output $q_n$ to +1 when $z_n$>Vo, and sets the output $q_n$ to −1 when $z_n$<Vo. On the other hand, the first DA converter dndac generates Vo=bn when the sample clock $CK_{sam}=1$, and generates Vo=bn±Ve when the sample clock $CK_{sam}=0$.

Consequently, as illustrated in FIG. 12, when the second clock CK2 rises from 0 to 1 during the hold mode when the sample clock $CK_{sam}=0$, the second comparator dn2 compares the analog input $z_n$ with the threshold input signal Vo=bn±Ve. The threshold input signal Vo is an analog random signal obtained by adding the ransom fluctuation component Ve, which has the sign of the digital random signal Vdran and the amplitude by the amplitude control signal Nvar, to the threshold voltage bn serving as the reference. The second comparator dn2 sets the output $q_n$ to +1 when $z_n$>Vo=bn±Ve, and sets the output $q_n$ to −1 when $z_n$<Vo=bn±Ve.

As illustrated in FIG. 12, in the case where the analog input has the voltage of $z_{n\_2}$ (in case of |Ve|>|Zn|), the output $q_n$ is $q_n=-1$ when the analog random signal Vo=bn+Ve, and the output $q_n$ is $q_n=+1$ when the analog random signal Vo=bn−Ve. That is, when |Ve|>|Zn|, the output $q_n$ of the second comparator dn2 is −1 or +1 depending on whether the sign of the fluctuation component Ve is + or − based on the digital random signal Vdran, and its probability is 50%.

On the other hand, in the case where the analog input $z_n$ has the voltage of $z_{n\_1}$ (in case of |Ve|<|Zn|), the output $q_n$ is $q_n=+1$ irrespective of whether the sign of the fluctuation component Ve is + or −. Conversely, in the case where the analog input $z_n$ has the voltage of $z_{n\_3}$ (in case of |Ve|<|Zn|), the output $q_n$ is $q_n=-1$ irrespective of whether the sign of the fluctuation component Ve is + or −. That is, when |Ve|<|Zn|, the output $q_n$ of the second comparator dn2 is +1 or −1 without corresponding to whether the sign of the fluctuation component Ve is + or −, and its probability is 100%. This means the following description.

Figure 13A:
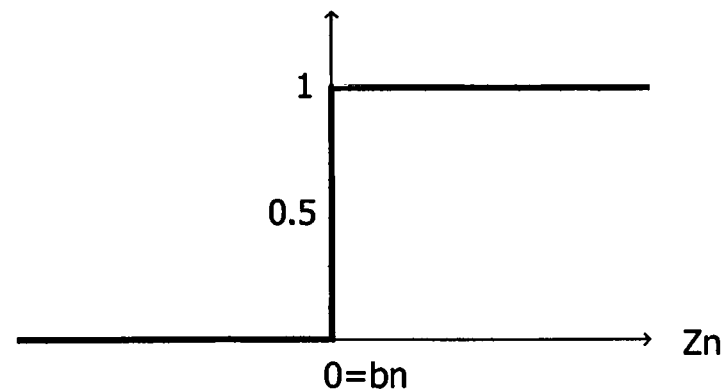
FIGS. 13A-13C are views illustrating the output function of the second comparator.
Figure 13B:
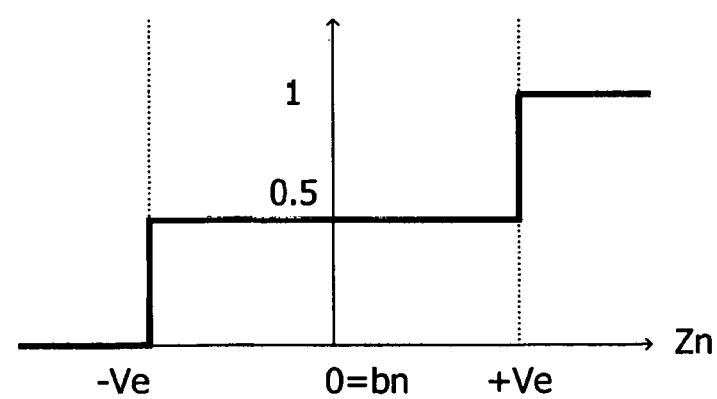
Figure 13C:
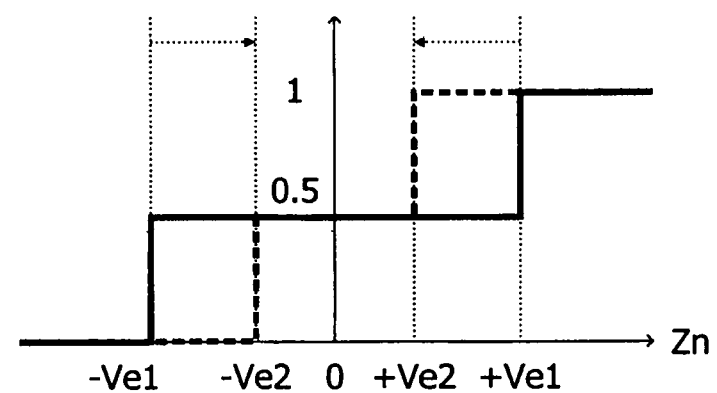

FIGS. 13A, 13B, and 13C are views illustrating the output function of the second comparator. In each of three graphs in FIGS. 13A, 13B, and 13C, the horizontal axis corresponds to the analog input $z_n$, and the vertical axis corresponds to the probability that the output $q_n$ of the comparator is $q_n=+1$. FIG. 13A illustrates the probability that the output is $q_n=+1$ in the case where a typical comparator compares the input voltage $z_n$ with the threshold voltage bn (=0 V). In this case, the probability that the output is $q_n=+1$ is 1.0 (100%) when $z_n$>bn, the probability that the output is $q_n=+1$ is 0.0 (0%) when $z_n$<bn, and the probability that the output satisfies $q_n=+1$ is 0.5 (50%) when $z_n$=bn.

On the other hand, FIG. 13B illustrates the probability that the output of the comparator is $q_n=+1$ in the case where the above-described second comparator dn2 compares the input $z_n$ with the analog random signal Vo=bn±Ve. In this case, the probability that the output is $q_n=+1$ is 1.0 (100%) when $z_n$>bn+Ve, and the probability that the output is $q_n=+1$ is 0.0 (0%) when $z_n$<bn−Ve. That is, in the case where |Zn|>|Ve|, the probability that the output is $q_n=+1$ is 1.0 (100%) or 0.0 (0%). However, when |Zn|<|Ve|, the probability that the output is $q_n=+1$ is 0.5 (50%). That is, the output is $q_n=+1$ or −1 with the probability of 50%.

FIG. 13C illustrates the output function (broken lines) in the case where the value of the amplitude control signal Nvar of the second comparator dn2 is reduced. When Navar is reduced, the fluctuation component Ve is reduced. As a result, a range in which the probability that the output is $q_n=+1$ is 0.5 (50%) is narrowed from −Ve1 to +Ve1 indicated by a solid line to −Ve2 to +Ve2 indicated by the broken line. That is, it is possible to arbitrarily change the range in which the probability that the output is $q_n=+1$ is 0.5 (50%) using the amplitude control signal Nvar.

Among the three types of the sigmoid functions illustrated in FIG. 4, FIG. 13A corresponds to the sigmoid function having T=0.5 in FIG. 4, FIG. 13B corresponds to the sigmoid function having T=2 in FIG. 4, and the broken line in FIG. 13C corresponds to the sigmoid function having T=1 in FIG. 4. Consequently, this means that the output function of the second comparator dn2 can be set to the sigmoid functions having different characteristics illustrated in FIG. 4 by varying the amplitude control signal Nvar.

Second Embodiment

Figure 14:
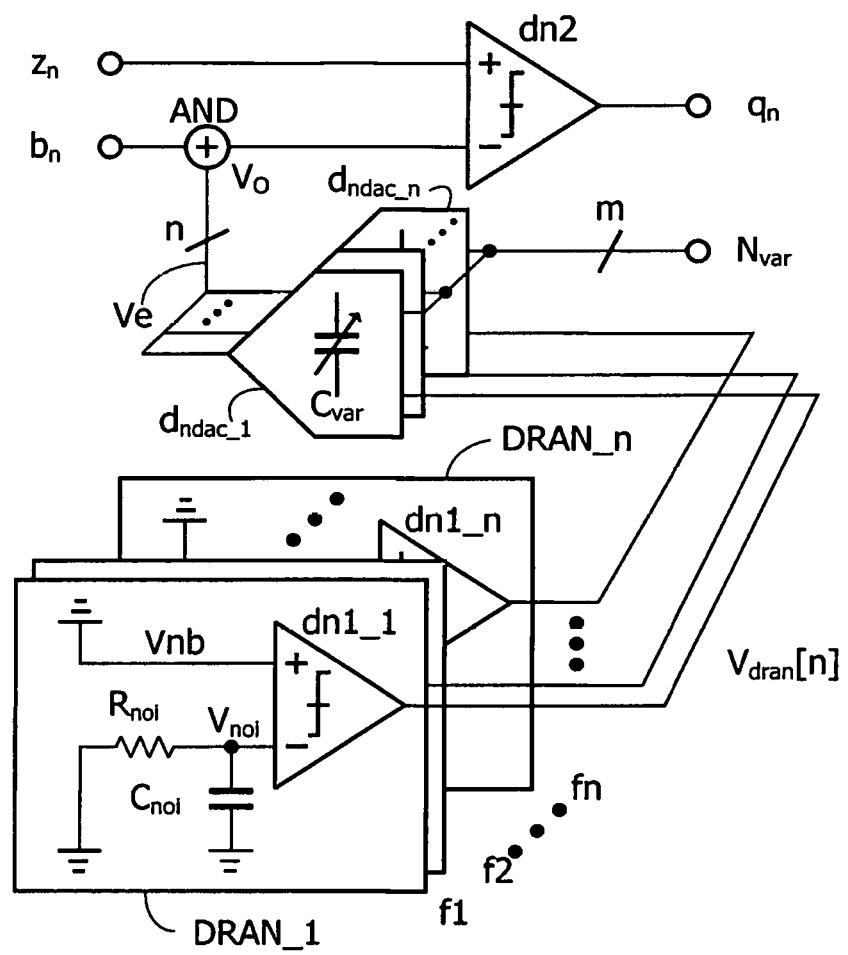
FIG. 14 is a view illustrating the configuration of the comparison circuit (comparison unit) in a second embodiment.
Figure 15:
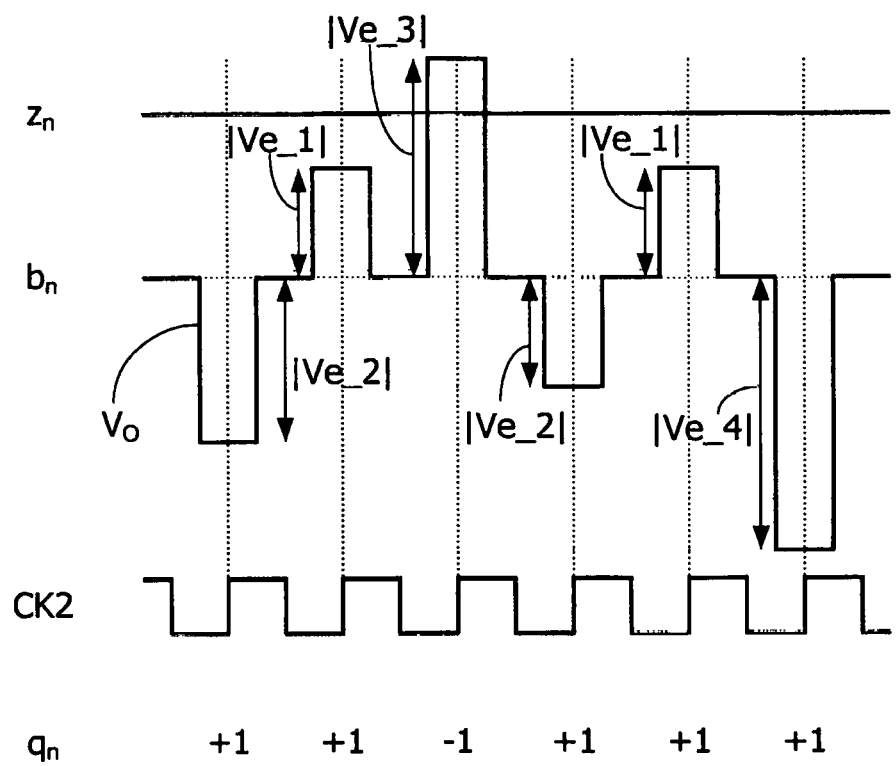
FIG. 15 is a view illustrating the signal waveform of the comparison circuit (comparison unit) in the second embodiment.

FIG. 14 is a view illustrating the configuration of the comparison circuit (comparison unit) in a second embodiment. In addition, FIG. 15 is a view illustrating the signal waveform of the comparison circuit (comparison unit) in the second embodiment. The comparison circuit (comparison unit) do in the second embodiment has n sets of digital random signal generators DRAN each of which has thermal noise generation circuit (Rnoi and Cnoi) and first comparison circuit dn1, and the first DA converters dndac that convert the digital random signals Vdran to the analog random signals Ve and vary the amplitudes of Ve respectively. To each of the first DA converters dndac_1 to dndac_n, the amplitude control signal Nvar is input in common. The n sets of analog random signals (voltages) Ve as the outputs of the n first DA converters dndac_1 to dndac_n are added to the threshold signal bn.

The n sets of digital random signal generators DRAN_1 to DRAN_n generate their respective digital random signals Vdran independently of each other. As a result, the number of combinations of the n sets of digital random signals Vdran[n] can be $2^n$, and the number of voltage levels of the total of the n sets of analog random signals Ve can be n+1, including the case where there is no Vdran indicative of +1 and there are n Vdran indicative of −1 to the case where there is no Vdran indicative of −1 and there are n Vdran indicative of +1. That is, the total voltage of the n sets of analog random signals Ve has the n+1 voltage levels, and it is possible to vary the n+1 voltage levels using the amplitude control signal Nvar. The n+1 voltage levels by the n analog random signals Ve are added to the voltage of the threshold signal bn.

The signal waveforms in FIG. 15 are examples of seven digital random signal generators and first DA converters, and the analog random signals |Ve_1| to |Ve_4| corresponding to eight voltage levels (four negative voltages and four positive voltages) are illustrated. The eight voltage levels correspond to the following eight combinations of seven digital random signals Vdran:

(−1, −1, −1, −1, −1, −1, −1)=−Ve_4
(+1, −1, −1, −1, −1, −1, −1)=−Ve_3
(+1, +1, −1, −1, −1, −1, −1)=−Ve_2
(+1, +1, +1, −1, −1, −1, −1)=−Ve_1
(+1, +1, +1, +1, −1, −1, −1)=+Ve_1
(+1, +1, +1, +1, +1, −1, −1)=+Ve_2
(+1, +1, +1, +1, +1, +1, −1)=+Ve_3
(+1, +1, +1, +1, +1, +1, +1)=+Ve_4

Figures 16A, 16B, 16C:
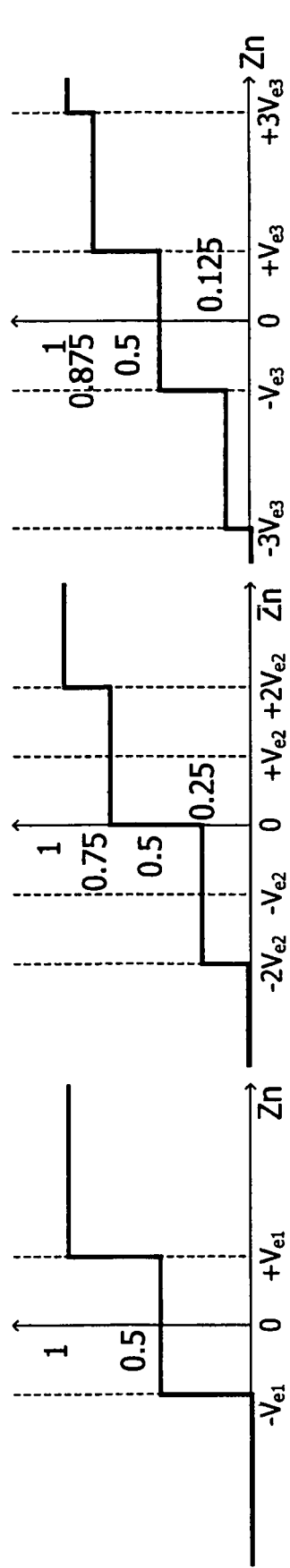
FIGS. 16A-16C are views illustrating the output function of the second comparator in the case where the number of pairs of the digital random signal generators and the first DA converters is one, two, or three.

FIGS. 16A, 16B, and 16C are views illustrating the output function of the second comparator in the case where the number of sets of the digital random signal generators and the first DA converters is one, two, or three.

In FIG. 16A, in the case where the number of sets thereof is one, there are two kinds of the digital random signals Vdran −1 and +1, and there are two kinds of the analog random signals −Ve1 and +Ve1. Consequently, the probability that the output $q_n$ is $q_n=+1$ is 0.0 when the input $z_n$ is $z_n$<−Ve, the probability is 0.5 when the input $z_n$ is −Ve<$z_n$<+Ve, and the probability is 1.0 when the input $z_n$ is +Ve<$z_n$.

In FIG. 16B, in the case where the number of sets thereof is two, the number of combinations of the two digital random signals Vdran is $2^2=4$, which includes (−1, −1), (+1, −1), (−1, +1), and (+1, +1), and there are three kinds of the analog random signals −2Ve2, 0, and +2Ve2. Consequently, the probability that the output $q_n$ is $q_n=+1$ is 0.0 when the input $z_n$ is $z_n$<−2Ve, the probability is 0.25 (=¼) when the input $z_n$ is −2Ve<$z_n$<0, the probability is 0.5 when the input $z_n$ is z=0, the probability is 0.75 (=¾) when the input $z_n$ is 0<$z_n$<+2Ve, and the probability is 1.0 when the input $z_n$ is +2Ve<$z_n$ is 1.0.

In FIG. 16C, in the case where the number of sets thereof is three, the number of combinations of the three digital random signals Vdran is $2^3=8$, and there are four kinds of the analog random signals $-3Ve3$, $-Ve3$, $+Ve3$, and $+3Ve3$. Consequently, the probability that the output $q_n$ is $q_n=+1$ is 0.0 when the input $z_n$ is $z_n<-3Ve$, the probability is 0.125 ($=\frac{1}{8}$) when the input $z_n$ is $-3Ve<z_n<-Ve$, the probability is 0.5 ($=\frac{4}{8}$) when the input $z_n$ is $-Ve<z_n<+Ve$, the probability is 0.875 ($=\frac{7}{8}$) when the input $z_n$ is $+Ve<z_n<+3Ve$, and the probability is 1.0 when the input $z_n$ is $+3Ve<z_n$.

As described above, according to the second embodiment, by increasing the number of sets of the digital random signal generators and the first DA converters, it is possible to make the waveform of the output function of the second comparator gradual to form a more natural waveform close to that of the sigmoid function.

[Annealing Operation of Boltzmann Machine]

In the Boltzmann machine described above, the digital random signal Vdran that randomly changes the sign of the noise based on the thermal noise is generated, the first DA converter dndac converts the digital random signal to the analog random signal $+Ve$ or $-Ve$ and varies its amplitude using the amplitude control signal Nvar, and the second comparator dn2 compares the input $z_n$ with the threshold $Vo=bn\pm Ve$ obtained by adding the analog random signal $\pm Ve$ to the threshold signal bn and generates the output $q_n$ ($+1$ or $-1$). In addition, as in the second embodiment, in the case where a plurality of the sets of the digital random signal generators and the first DA converters are provided, the number of kinds of the analog random signal is increased, and the waveform of the output function of the second comparator dn2 is made similar to the more natural waveform close to that of the sigmoid function.

In the present embodiment, in the process of repetition of the execution of the Boltzmann machine, the largest value of the amplitude control signal Nvar is changed to the smallest value, and the largest value of the amplitude of the noise level $\pm Ve$ of the threshold of the second comparator dn2 is changed to the smallest value. With this, the level of the thermal noise is successively reduced, and the probability that the energy of the network achieves the optimal solution as the smallest value is increased.

Figure 17:
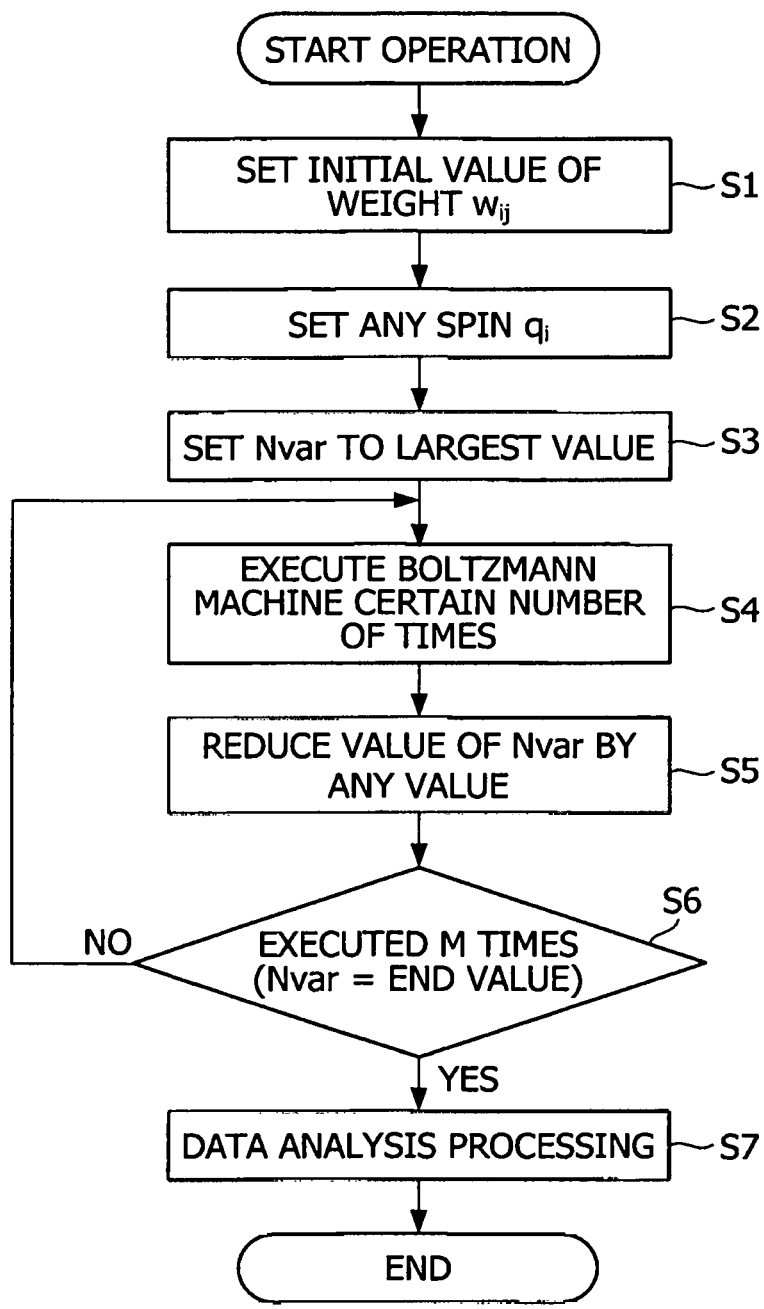
FIG. 17 is a flowchart illustrating the operation of the Boltzmann machine in the present embodiment.

FIG. 17 is a flowchart illustrating the operation of the Boltzmann machine in the present embodiment. In the Boltzmann machine in FIG. 17, first, the initial value of the weight $w_{xy}$ is set to the fixed value of the model (S1), and the spin $q_i$ of each node is set to an appropriate value ($+1$ or $-1$) (S2). Subsequently, the amplitude control signal Nvar of the analog random signal $\pm Ve$ is set to the largest value (S3). In this state, the Boltzmann machine is executed any number of times (S4).

Figure 18:
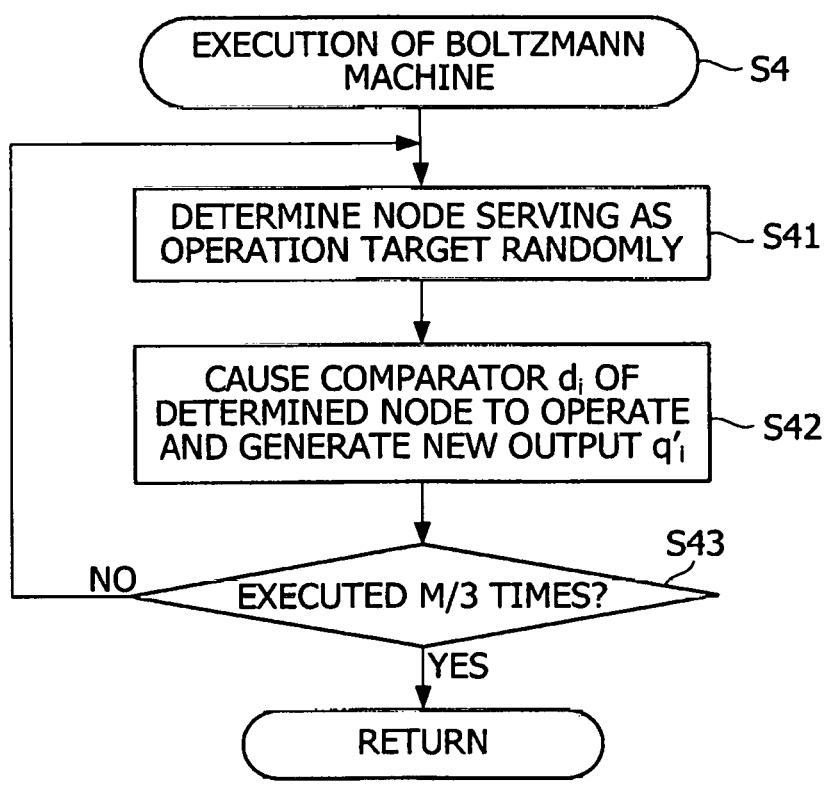
FIG. 18 is a flowchart illustrating the detail of the execution step S4 of the Boltzmann machine.

FIG. 18 is a flowchart illustrating the detail of the execution step S4 of the Boltzmann machine. In the execution of the Boltzmann machine, the node or nodes serving as the operation target is or are randomly determined (S41), the comparator (comparison unit) $d_i$ of the determined node or nodes is or are caused to operate, and the new output $q'_i$ is or are generated from the analog outputs $z_i$ of the digital adders $a_i$ for the outputs $q_1$ to $q_n$ of all of the current nodes (S42). As a result, the combination of the outputs $q_1$ to $q_n$ of all of the nodes is changed to a different combination thereof by updating, and the digital adders a1 to an of the individual nodes generate addition values $z_{1d}$ to $z_{nd}$ corresponding to the new outputs $q_1$ to $q_n$. Further, the energy value of the network to the new combination of the outputs $q_1$ to $q_n$ transitions to another value.

In this transition, the second comparator operates in the following manner:

the second comparator outputs $q'_i=+1$ when $\Sigma_j w_{ij} q_j - (b_i \pm Ve) > 0$, and outputs $q'_i=-1$ when $\Sigma_j w_{ij} q_j - (b_i \pm Ve) < 0$.

The operation of the second comparator has the case where the sign of the output $q_i$ is inverted and the case where the sign thereof is not inverted. In the case where the sign thereof is inverted, the energy value E of the network is reduced. Further, there are cases where, by adding the noise to the threshold, the sign of the output $q_i$ is not inverted even in the operation that usually inverts the sign thereof and, in those cases, the energy value E of the network is increased. With the malfunction of the second comparator resulting from the noise, it is possible to transition to the combination of the outputs $q_i$ generating the energy value that allows the escape from the minimum value as the local solution. Note that, during the execution of the Boltzmann described above, the calculation of the energy value of the network is not performed usually.

When the number of times of execution of the Boltzmann machine is assumed to be M times, and the number of times of reduction of the noise level of the annealing is assumed to be 3 times, for example, the random determination of the node of nodes serving as the operation target (S41) and the generation of the new output $q'_i$ by causing the comparator $d_i$ of the determined node or nodes to operate (S42) are repeated until the number of times of the execution thereof reaches M/3 times. Herein, causing the comparator $d_i$ serving as the comparison unit of the node to operate means causing the second comparator $d_i2$ in the comparison unit $d_i$ to execute the comparison operation in synchronization with the clock CK2. The first comparator $d_i1$ in the comparison unit $d_i$ performs the comparison operation with the clock CK1 that is independent of the operation timing in the step S42, and continuously generates the digital random signal Vdran.

Returning to FIG. 17, the value of the amplitude control signal Nvar is reduced by any value (S5), and the above steps S4 and S5 are repeated while the total number of times of the execution does not reach M times (NO in S6). That is, the value of the amplitude control signal Nvar is reduced by any value, the magnitude of the noise amplitude Ve of the threshold voltage $Vo=bi\pm Ve$ of the second comparator $d_i2$ is reduced, and the step S4 is executed M/3 times again.

When the total number of times of the execution reaches M times (YES in S6), that is, when the amplitude control signal Nvar reaches the smallest value serving as an end value, the execution of the Boltzmann machine is ended, and data analysis processing is performed (S7). In the data analysis processing, the energy E of the network of the Boltzmann machine is calculated and recorded in a memory appropriately.

When the energy E has not reached the optimal value as the smallest value (or is not reduced to a value close to the optimal value), the number of times of the execution is increased or the reduction width of the amplitude control signal Nvar is reduced, and the flowchart in FIG. 17 is executed again. When the energy E has reached the optimal value (or is reduced to a value close to the optimal value), the execution of the Boltzmann machine is ended. For reference, when the number of times of the execution of the Boltzmann machine is infinite, the energy E reaches the smallest value (optimal value) theoretically.

Figure 19A:
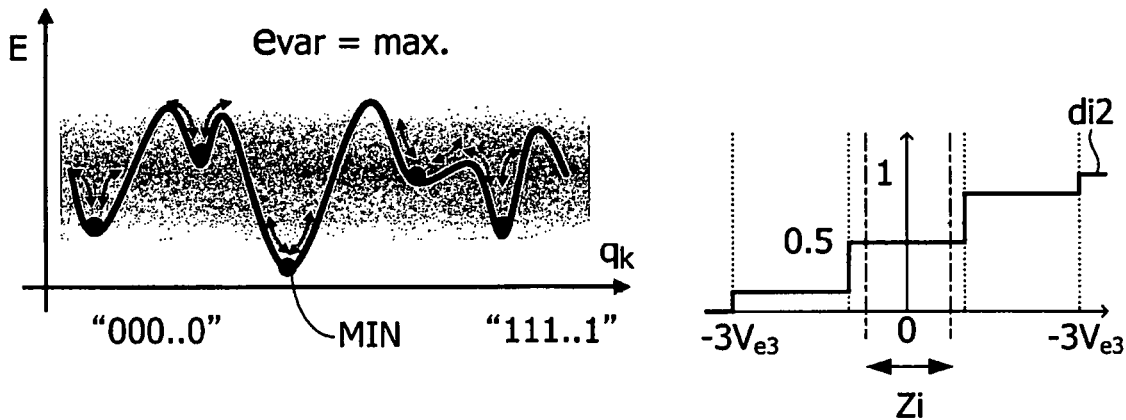
FIGS. 19A-19C are views illustrating three phases of the execution of the Boltzmann machine in the present embodiment.
Figure 19B:
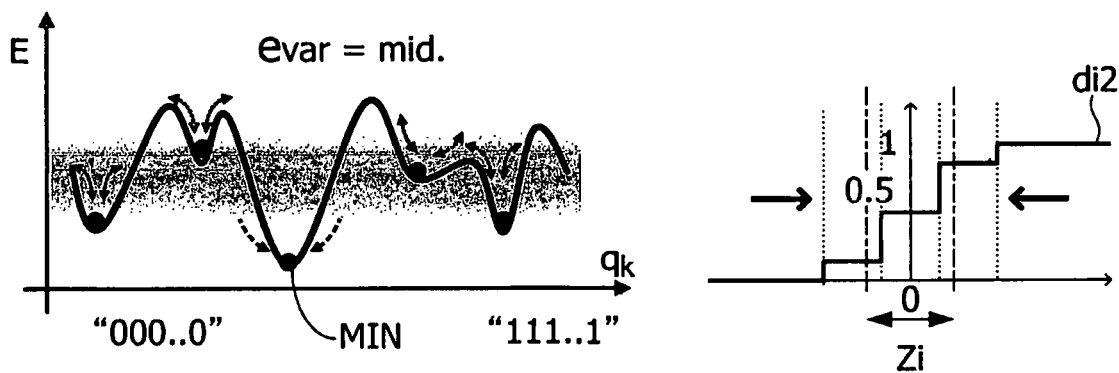
Figure 19C:
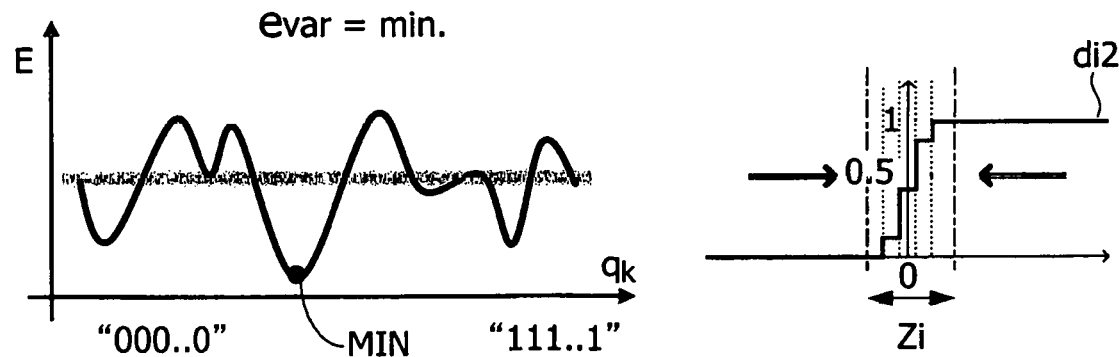

FIGS. 19A, 19B, and 19C are views illustrating three phases of the execution of the Boltzmann machine in the present embodiment. Graphs on the left are the same as those in FIG. 3. On the other hand, each of graphs on the right denotes the sigmoid function of the second comparator $d_i2$ of the present embodiment and the range of the output $z_i$ of the digital adder $a_i$ in the node ND_i. The sigmoid function corresponds to the case of three sets of the digital random signal generators and the first DA converters in FIG. 16C. Consequently, the sigmoid function provides different probabilities with the voltages of the analog random signal of −3V3e, −Ve3, +Ve3, and +3Ve3.

In the state of FIG. 19A, the amplitude of the noise has the largest value, the characteristic of the sigmoid function is very gradual, and the probability that the output $q_i$ of the second comparator is +1 is 0.5 only in the range of the output $z_i$ of the digital adder $a_i$. As a result, the second comparator generates the wrong output $q_i$ with the probability of 0.5, and the energy of the network can be prevented from remaining at the local minimum value and move toward the optimal value.

In the state of FIG. 19B, the amplitude of the noise is a medium amplitude, the characteristic of the sigmoid function is slightly steep, and the probability that the output $q_i$ of the second comparator is +1 is 0.125, 0.5, or 0.825 in the range of the output $z_i$ of the digital adder $a_i$. As a result, there are cases where the second comparator generates the wrong output $q_i$ with the probability of 0.125, 0.5, or 0.825, and the energy of the network can be prevented from remaining at the local minimum value.

In the state of FIG. 19C, the amplitude of the noise is smallest, the characteristic of the sigmoid function is very steep, and the probability that the output $q_i$ of the second comparator is +1 is 0.0, 0.125, 0.5, 0.825, or 1.0 in the range of the output $z_i$ of the digital adder $a_i$. As a result, the probability that the second comparator generates the wrong output $q_i$ is reduced, and the energy of the network is likely to remain at the minimum value.

Thus, by varying the amplitude control signal Nvar from the largest value to the smallest value, it is possible to execute the Boltzmann machine while performing the annealing.

[Information Processing Device Having Boltzmann Machine]

Figure 20:
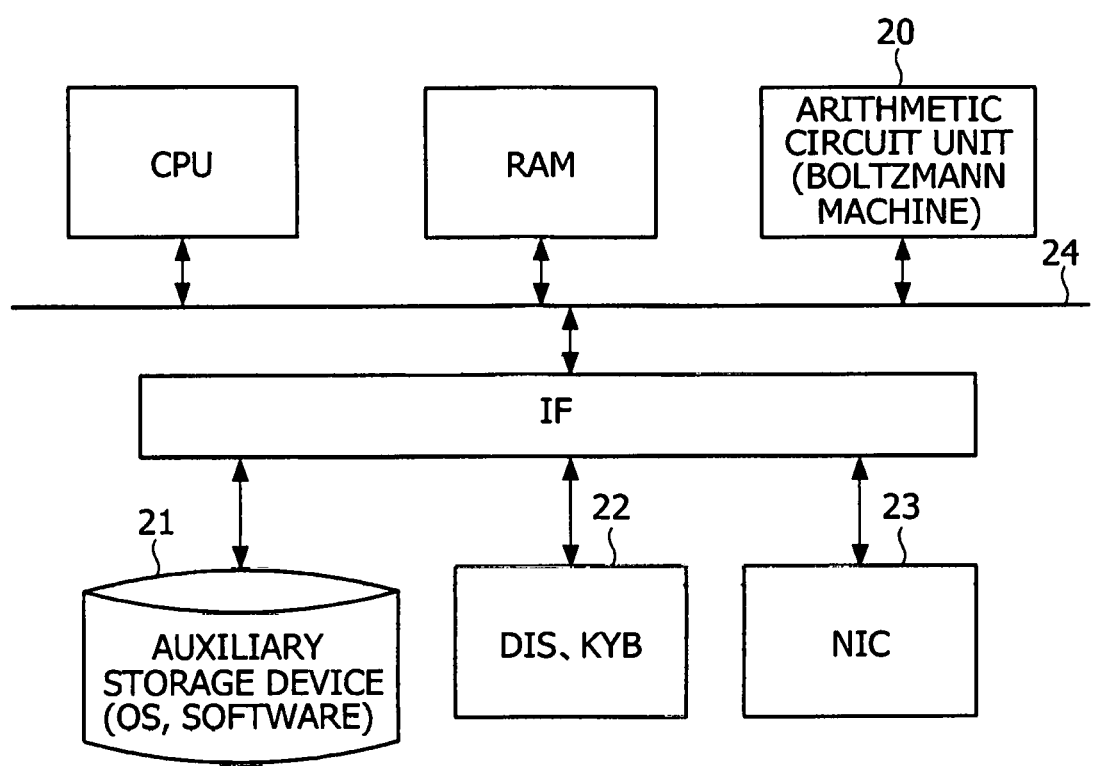
FIG. 20 is a view illustrating an information processing device that has the Boltzmann machine.

FIG. 20 is a view illustrating an information processing device that has the Boltzmann machine. The information processing device is a computer, and has a processor CPU, a memory RAM, an arithmetic circuit unit 20 serving as the Boltzmann machine, an interface IF, an auxiliary storage device 21 such as a hard disk, an input/output device 22 such as a display and a keyboard, a network interface 23, and a bus 24 that connect the above elements.

The arithmetic circuit unit 20 is a network circuit that has circuit units of a plurality of the nodes in FIG. 5 and a plurality of digital arithmetic units between the nodes. When necessity for the processor CPU to determine the optimal solution occurs during execution of a program in the auxiliary storage device 21, the processor executes the arithmetic circuit unit 20 to acquire the optimal solution instead of executing the program to determine the optimal solution.

Thus, the Boltzmann machine in the present embodiment generates the digital random signal from the thermal noise with the small circuit scale, determine the sign of the noise in accordance with the digital random signal, varies the amplitude of the noise using the amplitude control signal Nvar, and generates the noise signal. Consequently, the Boltzmann machine generates the noise signal with the small circuit scale and easily varies the noise amplitude, and hence it is possible to perform the annealing control of the Boltzmann machine.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A Boltzmann machine, comprising:
    a plurality of circuit units each of which has an adder that performs addition of a plurality of weighted input signals and a comparison unit that compares an output signal of the adder with a threshold signal to output a binary output signal; and
    a plurality of digital arithmetic units each of which generates each of the weighted input signals by weighting the binary output signal of a first circuit unit of a pair of the circuit units in the plurality of circuit units with a weight to output the weighted input signal to a second circuit unit of the pair of the circuit units,
    wherein the comparison unit ($d_n$) has:
        a first comparator ($d_{n1}$) that compares a thermal noise with a reference voltage in synchronization with a first clock to output a binary digital random signal;
        a first digital/analog converter ($d_{ndac}$) that converts the binary digital random signal to an analog random signal ($V_e$) that has two levels corresponding to the binary digital random signal, and varies a magnitude of the two levels of the analog random signal; and
        a second comparator ($d_{n2}$) that compares the analog random signal ($V_e$) combined with a fixed signal ($b_n$), as the threshold signal ($V_o$), to the output signal ($Z_n$) of the adder and outputs the binary output signal with a predetermined probability function.

2. The Boltzmann machine according to claim 1, wherein a part of the plurality of circuit units that is randomly selected operates a predetermined number of times while an amplitude of the analog random signal is successively reduced.

3. The Boltzmann machine according to claim 1, wherein the first digital/analog converter controls a sign of the analog random signal based on the binary digital random signal, and varies an amplitude of the analog random signal based on a magnitude control signal that is supplied to the first digital/analog converter.

4. The Boltzmann machine according to claim 3, wherein the first digital/analog converter has a plurality of capacitive elements and a plurality of switches provided to the plurality of capacitive elements respectively,
    each of the plurality of switches applies a positive reference voltage or a negative reference voltage based on the binary digital random signal to a first terminal of each of the plurality of capacitive elements, and generates the analog random signal at a second terminal common to the plurality of capacitive elements,
    a number of the plurality of switches applying the positive voltage or the negative voltage is controlled by the magnitude control signal.

5. The Boltzmann machine according to claim 1, wherein the second comparator performs a comparison operation in synchronization with a second clock, and outputs the binary output signal.

6. The Boltzmann machine according to claim 3, wherein the comparison unit has a plurality of sets of first comparators and first digital/analog converters that receive binary digital random signals of the first comparators respectively, the magnitude control signal is input in common to each of the first digital/analog converters, and analog random signals of the first digital/analog converters are added up to input to the second comparator.

7. The Boltzmann machine according to claim 1, wherein the output signal of the adder is a digital output signal, each of the circuit units has a second digital/analog converter that converts the digital output signal of the adder to an analog output signal, and the comparison unit compares the analog output signal with the threshold signal.

8. A method for controlling Boltzmann machine, the method comprising:
adding, in a plurality of circuit units in the Boltzmann machine, each of which has an adder and a comparison unit, a plurality of weighted input signals;
comparing, in the comparison unit in each of the circuit units, an output signal of the adder with a threshold signal to output a binary output signal;
generating, in a plurality of digital arithmetic units in the Boltzmann machine, the weighted input signals by weighting the binary output signal of a first circuit unit of a pair of the circuit units in the plurality of circuit units with a weight to output the weighted input signal to a second circuit unit of the pair of the circuit units;
comparing in a first comparator of the comparison unit in each of the circuit units, a thermal noise with a reference voltage in synchronization with a first clock to output a binary digital random signal;
converting in a first digital/analog converter of the comparison unit in each of the circuit units, the binary digital random signal to an analog random signal that has two levels corresponding to the binary digital random signal, with variation in a magnitude of the two levels of the analog random signal; and
comparing in a second comparator of the comparison unit in each of the circuit units, the analog random signal combined with a fixed threshold signal to the output signal of the adder to generate the binary output signal with a predetermined probability function.

9. An information processing device comprising:
a processor that executes instructions of a program; and
an arithmetic circuit unit that operates in response to an operation request from the processor,
wherein the arithmetic circuit unit includes
a plurality of circuit units each of which has an adder that performs addition of a plurality of weighted input signals and a comparison unit that compares an output signal of the adder with a threshold signal to output a binary output signal; and
a plurality of digital arithmetic units each of which generates each of the weighted input signals by weighting the binary output signal of a first circuit unit of a pair of the circuit units in the plurality of circuit units with a weight to output the weighted input signal to a second circuit unit of the pair of the circuit units,
wherein the comparison unit has:
a first comparator that compares a thermal noise with a reference voltage in synchronization with a first clock to output a binary digital random signal;
a first digital/analog converter that converts the binary digital random signal to an analog random signal that has two levels corresponding to the binary digital random signal, and varies a magnitude of the two levels of the analog random signal; and
a second comparator that compares the analog random signal combined with a fixed threshold signal to the output signal of the adder to generate the binary output signal with a predetermined probability function.

10. The information processing device according to claim 9, wherein a part of the plurality of circuit units that is randomly selected operates a predetermined number of times while an amplitude of the analog random signal is successively reduced.

* * * * *